(12) United States Patent
Kikuchi

(10) Patent No.: US 6,481,085 B1
(45) Date of Patent: Nov. 19, 2002

(54) DISC CARTRIDGE AND METHOD AND APPARATUS FOR MANUFACTURE THEREFOR

(75) Inventor: Shuichi Kikuchi, Miyagi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/357,514

(22) Filed: Jul. 16, 1999

(30) Foreign Application Priority Data

Jul. 17, 1998 (JP) .......................................... 10-203831
Apr. 12, 1999 (JP) .......................................... 11-104141

(51) Int. Cl.$^7$ .......................... B23P 11/00; B23P 21/00; B23P 19/00
(52) U.S. Cl. .............................. 29/436; 29/434; 29/721; 29/737; 29/760
(58) Field of Search ............................. 29/434, 436, 464, 29/721, 737, 759, 760, 762, 281.1; 369/291; 360/133

(56) References Cited

U.S. PATENT DOCUMENTS

| 4,862,448 A | 8/1989 | Tanaka et al. .............. 369/297 |
| 5,671,212 A | * 9/1997 | Miyazaki et al. ........... 369/291 |
| 5,973,893 A | * 10/1999 | Mizuta ........................ 360/133 |

FOREIGN PATENT DOCUMENTS

| DE | 44 11 881 A1 | 10/1994 |
| DE | 196 22 875 | 12/1997 |
| EP | 0 498 606 A2 | 8/1992 |
| EP | 0 592 886 A2 | 4/1994 |
| JP | 409120659 | * 5/1997 |
| WO | 98/38633 | 9/1998 |

* cited by examiner

Primary Examiner—S. Thomas Hughes
Assistant Examiner—John C. Hong
(74) Attorney, Agent, or Firm—Rader, Fishman, & Grauer PLLC; Ronald P. Kananen, Esq.

(57) ABSTRACT

In manufacturing a disc cartridge having a pair of opposing upper and lower shells, and an information recording medium disc accommodated therebetween, first ends of the shells are coupled, second ends of the shells are coupled when first ends of the shells are coupled, and the disc is inserted from the opened second ends of the shells.

20 Claims, 24 Drawing Sheets

DISC CARTRIDGE AND METHOD AND APPARATUS FOR MANUFACTURE THEREFOR

BACKGROUND OF THE INVENTION

1. Field of the Invention

The present invention relates to a method and an apparatus for manufacturing a disc cartridge accommodating therein a disc serving as an information-recording medium, and to a disc cartridge.

2. Description of the Related Art

Optical discs or magnetic discs are accommodated in cartridges so as to facilitate handling. FIG. 30 is an exploded perspective view showing an example of a conventional disc cartridge. A disc cartridge 110 includes a disc 120 as an information-recording medium, a cartridge 130 in which the disc 120 is rotatably accommodated, and a shutter 140 slidably attached to the cartridge 130.

The disc 120 is formed of a synthetic resin, such as a polycarbonate resin, a polystyrene resin, a polyolefin resin, a polymethylmethacrylate resin, or a norbornene-based resin, or aluminum or glass, and is annular. The disc 120 has an optical recording layer or a magneto-optic recording layer 121 formed on a principal plane thereof, and a chucking hub (center core) 122 made of a magnetic metal is attached to the central section thereof.

The cartridge 130 is formed in the shape of a flat box by injection molding of a thermoplastic resin, such as an ABS resin and a polycarbonate resin. The cartridge 130 consists of an upper shell 131 and a lower shell 132 coupled by screws 133. The upper shell 131 has a recording/reproducing opening 131a formed in the center of a front end (a leading end in a direction of insertion into a driving device) thereof, and first to fourth circular-arc ribs 131b to 131e formed on the same circumference of the periphery of the inner surface thereof. These ribs 131b to 131e forms a rigid circular disc accommodating section 131f for rotatably accommodating the disc 120. The lower shell 132 has a recording/reproducing opening 132a, first to fourth circular-arc ribs 132b to 132e, and a circular disc accommodating section 132f similarly to the upper shell 131, and a driving (spindle shaft-inserting) opening 132g to which the chucking hub 122 of the disc 120 faces is formed in the center of the disc accommodating section 132f.

The shutter 140 is formed into a U-shape in cross section by punching and bending a thin metal sheet having a thickness of about 0.15 mm to 0.4 mm, such as a stainless steel sheet or an aluminum sheet, or by injection molding of an acetal resin. The shutter 140 consists of a pair of upper and lower shutter plate portions 141 and 142 superposed on the outer surfaces of the upper and lower shells 131 and 132, and a connecting portion 143 for connecting one of the ends of the shutter plate portions 141 and 142. The shutter plate portion 141 is formed so as to have a length capable of opening and closing the opening 131a of the upper shell 131, and the shutter plate portion 142 is formed so as to have a length capable of opening and closing both of the openings 132a and 132g of the lower shell 132.

The shutter 140 is slidably attached to the front end of the cartridge 130 in a state where legs 151 and 152 of a slide guide member 150 attached to the inner surface of the connecting portion 143 by screws 133 are engaged with a slide guide groove 132h provided in the lower shell 132, and the slide guide member 150 is sandwiched by the upper and lower shells 131 and 132, and is biased by a torsion coil spring 160 to keep the openings 131a, 132a, and 132g closed.

A shutter guide plate 170 for preventing an end of the longer shutter plate portion 142 from curling is attached to the outer surface of the lower shell 132. An accidental erasure-protecting member 180 is attached on the inner surface of the upper shell 131. The accidental erasure-protecting member 180 has lugs 181 on both side surfaces thereof, as shown in FIG. 31, and the lugs 181 are engaged with recesses 131i formed in the inner wall of the upper shell 131.

The thus-constructed disc cartridge 110 is assembled in a clean room using an automated assembly line so that dust does not adhere to the surface of the disc 120 and does not enter the cartridge 130 during assembly, which would affect recording and reproducing. The upper and lower shells 131 and 132 are brought together and stocked so as not to deform after being subjected to injection molding, and are placed on the assembly line on a conveyor. First, the upper and lower shells 131 and 132 are divided in a first step, the shutter guide plate 170 is bonded to the outside of the lower shell 132 in a second step, and then the accidental erasure-protecting member 180 supplied from a part feeder is engaged with the inner surface of the lower shell 132 at a predetermined position in a third step. The slide guide member 150 supplied from the part feeder is engaged with the slide guide groove 132h of the lower shell 132 in a fourth step.

Then, the disc 120 having the chucking hub 122 attached thereto and being stocked in a disc stocker is accommodated in the disc accommodating section 132f of the lower shell 132 and thereafter, the upper shell 131 that has been supplied on the line in synchrony with the lower shell 132 is coupled to the lower shell 132 by screws 133 in a sixth step. The head of the shutter plate portion 142 is inserted into a space between the shutter guide plate 7 and the lower shell 132, and holes of the connecting section 143 and the slide guide member 150 are coupled by the screws 133. Finally, the torsion coil spring 160 supplied from the part feeder is attached to the shutter 140 to complete the disc cartridge 110.

The disc cartridge 110 is sent to an inspection step to be subjected to recording/reproducing inspection. A disc cartridge 110 confirmed to have sufficient quality is sent to a packaging step to be packaged together with an index card and a label and is accommodated in a plastic case, etc., and is then sealed by a plastic film, etc., to be distributed commercially. On the other hand, a disc cartridge 110 that is determined to be defective follows the above assembly step in reverse to remove the disc 120. Thereafter, swarf of tapping screws produced at the time of fastening screws is removed by high-pressure clean air, and the disc cartridge 110 is introduced in the assembly step again, and a new disc 120 is incorporated into the disc cartridge 110.

In order to manufacture the above-described conventional disc cartridge 110, it is necessary to install and maintain a long assembly line, and a large clean room having a high-performance clean air feeder for installing the assembly line.

In addition, adjustment of an overall tact (volume of production per unit time) is required to synchronize the manufacture of the disc 120 and the assembly of the disc cartridge 110, resulting in a reduction in operational availability of the assembly line.

Furthermore, the disc cartridge 110 that is determined to be defective must follow the assembly step in reverse and follow the assembly step again. Therefore, not only are complicated operations required, but also components may be damaged and the yield of the components may be reduced when disassembling the disc cartridge 110.

Furthermore, when the tapping screws for use in coupling the upper and lower shells 131 and 132 are repeatedly removed and fastened, coupling strength of the upper and lower shells 131 and 132 is lowered. Therefore, the upper and lower shells 131 and 132 must be destroyed when the disc cartridge 110 is determined to be defective a second time.

SUMMARY OF THE INVENTION

Accordingly, it is an object of the present invention to provide a method and apparatus for manufacturing a disc cartridge for which a large-scale manufacturing facility is not required and of which manufacturing efficiency is high, and to provide a disc cartridge.

According to a first aspect of the present invention, there is provided a method for manufacturing a disc cartridge having a pair of opposing upper and lower shells, and an information recording medium disc accommodated therebetween. The method includes mutually coupling first ends of the shells; opening second ends of the shells when first ends of the shells are coupled; and inserting the disc from the second ends of the shells.

According to a second aspect of the present invention, there is provided an apparatus for manufacturing a disc cartridge having a pair of opposing upper and lower shells, an information recording medium disc accommodated therebetween. The apparatus includes a first-end coupling device for mutually coupling first ends of the shells; and a second-end opening device for opening second ends of the shells when first ends of the shells are coupled by the first-end coupling device, wherein the disc is inserted from the opened second ends of the shells.

According to a third aspect of the present invention, there is provided a disc cartridge, wherein second ends of a pair of opposing upper and lower shells are opened when first ends of the shells are coupled, and a disc is inserted and accommodated in the shells.

According to the above feature, the second end of a semifinished cartridge having components incorporated therein is opened, and a disc is inserted from the second end. Therefore, it is possible to inspect the quality of the disc after inserting the disc, to complete a disc cartridge only from an accepted product of cartridge by coupling the second end thereof, and to remove a defective disc by opening the second end of a defective product of cartridge again.

DESCRIPTION OF THE PREFERRED EMBODIMENTS

The present invention will be explained below in its preferred forms, and suitable technical limitations are thus imposed on the embodiments. However, it is to be understood that the invention is not limited to the specific forms of the embodiments thereof unless otherwise specified in the following description.

Figure 1:
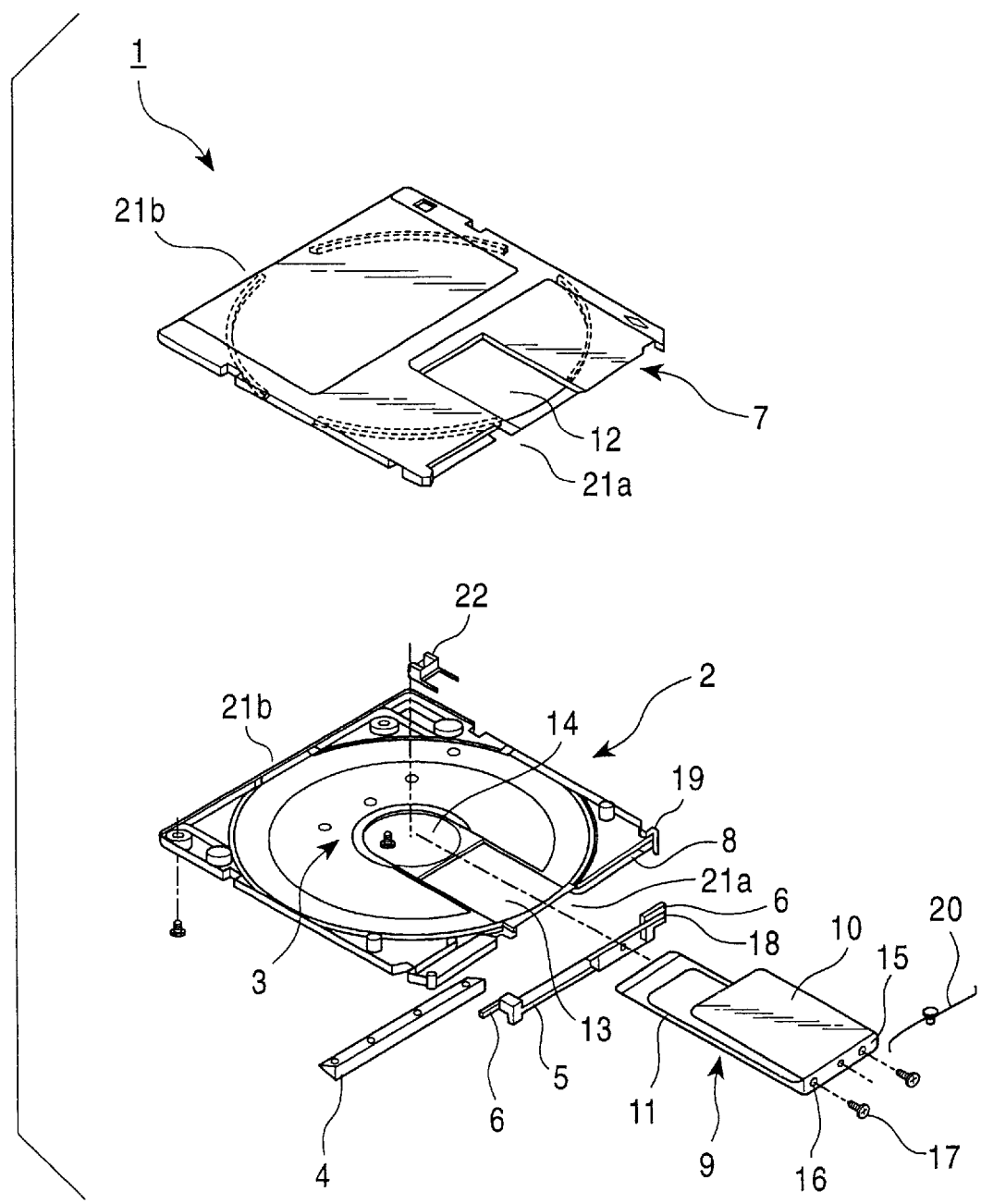
FIG. 1 is an exploded perspective view showing a cartridge that constitutes embodiments of a disc cartridge of the present invention.

FIG. 1 is an exploded perspective view showing a cartridge that constitutes embodiments of a disc cartridge of the present invention.

In a cartridge 1, a shutter guide plate 14 formed by injection molding of a polycarbonate (PC) resin is attached to the position denoted by numeral 3 on the outside of the lower shell 2 formed by injection molding of a thermoplastic resin, such as a PC resin, an ABS resin, or an AS resin by ultrasonic welding. Legs 6 of a slide guide member 5 formed by injection molding of a thermoplastic resin, such as a polyacetal (POM) resin, a polypropylene (PP) resin, or a nylon resin are engaged with a slide guide groove 8 formed in the lower shell 2. An upper shell 7 formed by injection molding of a thermoplastic resin, such as a PC resin, an ABS resin, or an AS resin is superposed and coupled onto the lower shell 2 by ultrasonic welding at front ends (leading ends in a direction of insertion into a driving device) 21a.

A substantially U-shaped shutter 9 is formed by press working of an aluminum sheet or a stainless steel sheet having a thickness of 0.3 mm or by injection molding of a thermoplastic resin, such as a POM resin or a PP resin. That is, the shutter 9 having a shape such that a plate portion 10 for covering a recording/reproducing opening 12 of the upper shell 7 and a plate portion 11, which is longer than the plate portion 10, for covering a recording/reproducing opening 13 and a driving opening 14 of the lower shell 2 are connected via a connecting portion 15, is coupled to the slide guide member 5 by screws 17 that are inserted into screw holes 16 formed in the connecting section 15. To prevent the recording/reproducing openings 12 and 13 and the driving opening 14 from accidentally opening, the shutter 9 is biased by a torsion coil spring 20 provided between an end 18 of the slide guide member 5 and a side wall 19 of the lower shell 2 so as to cover these openings 12 13, and 14.

Figure 30:
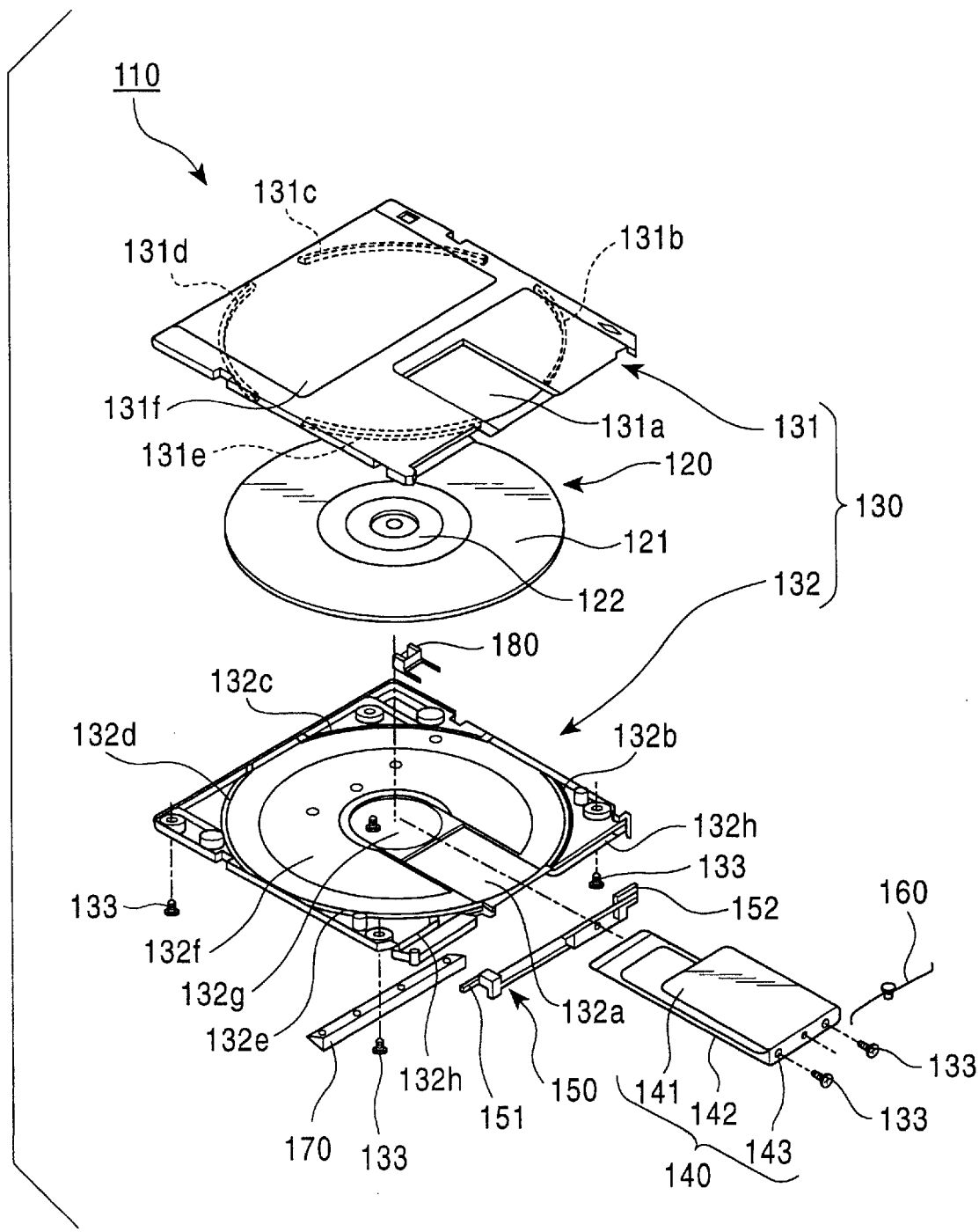
FIG. 30 is an exploded perspective view showing an example of a conventional disc cartridge.

The above construction is substantially the same as that of the conventional cartridge 130 shown in FIG. 30, but the cartridge 1 of this embodiment is different from the conventional cartridge 130 in setting of a disc 31. That is, unlike the conventional cartridge 130 in which the disc is accommodated before coupling the upper and lower shells 131 and 132, the front ends 21a of the upper and lower shells 7 and 2 are coupled after incorporation of the slide guide member 5, the shutter 9, and the torsion coil spring 20, but the rear ends 21b are kept uncoupled, and the disc 31 is inserted therefrom and then, the rear ends 21b are coupled.

Figure 32:
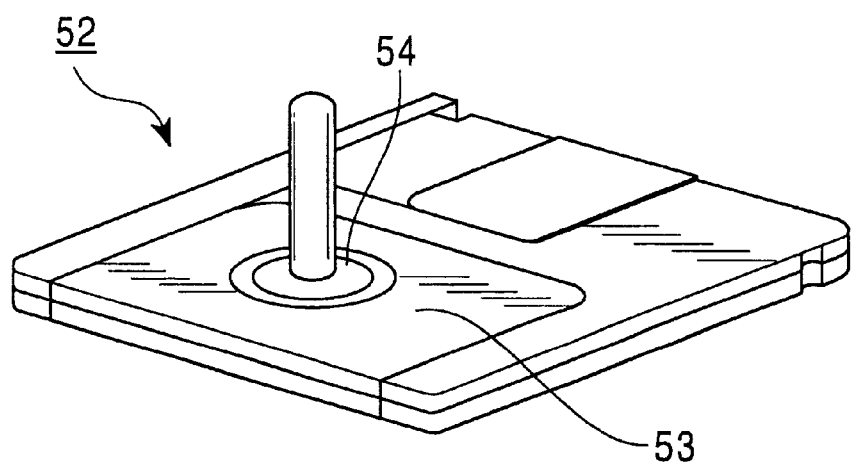
FIG. 32 is a perspective view showing an example in which the disc cartridge shown in FIG. 30 is opened.

In a low-profile cartridge, such as a 3.5 MFD, a top surface 53 of an upper shell of a cartridge 52 can be opened by an vacuum-chucking air nozzle 54, as shown in FIG. 32. In order to open a thick cartridge 1 formed of a highly rigid material, such as a PC resin, by the vacuum-chucking air nozzle 54, however, the vacuum-chucking area must be increased. The increase in vacuum-chucking area, however, causes an adsorption section to be deformed, and a vacuum-chucking power is lowered when the cartridge 1 is opened and the upper shell 7 is warped. Therefore, it is very difficult to maintain the rear end 21b of the cartridge open while the disc 31 is inserted into the cartridge 1. The following device is thus employed.

Figure 2:
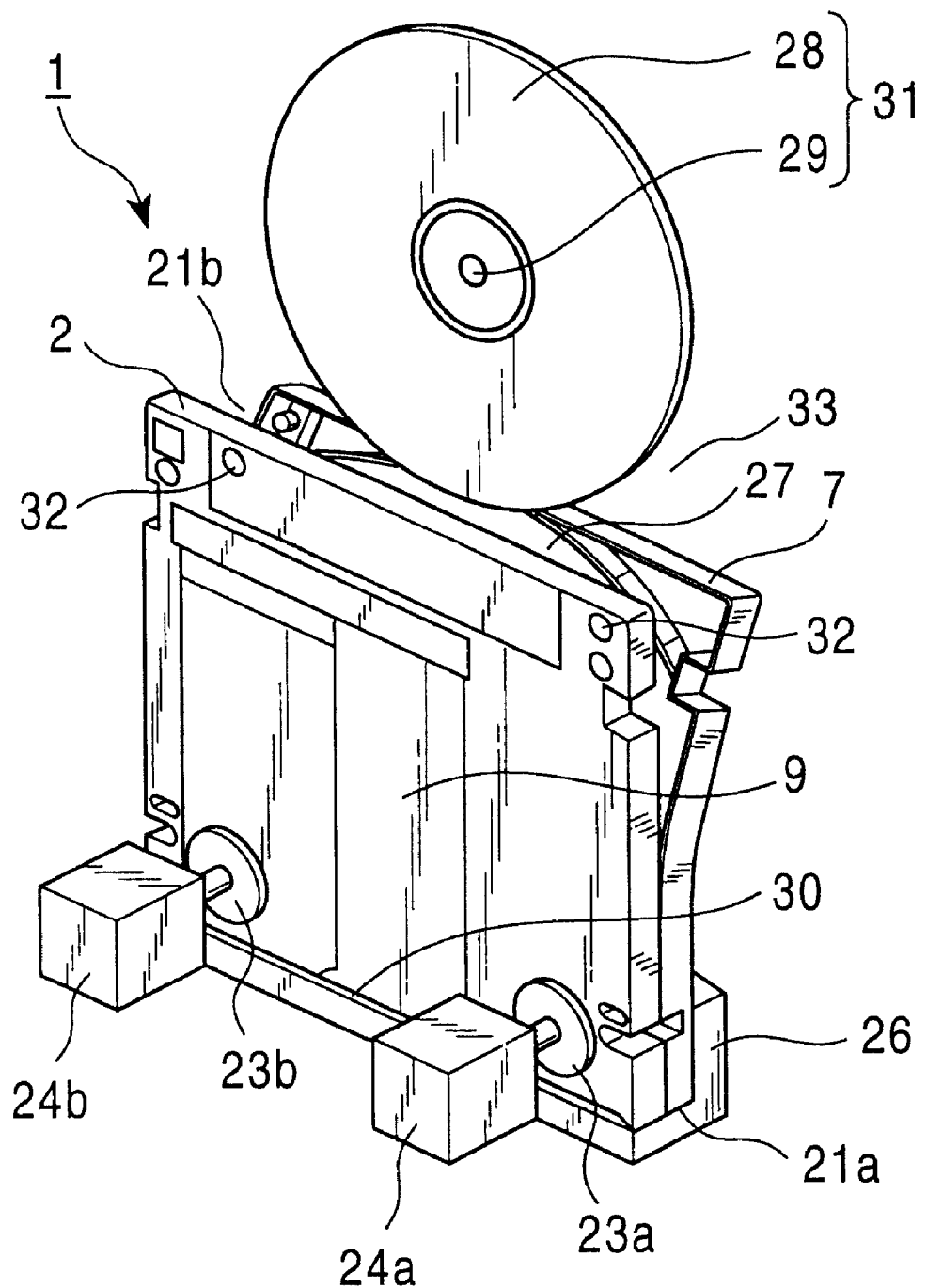
FIG. 2 is a perspective view showing a first embodiment of a setting device for setting a disc in the cartridge shown in FIG. 1.
Figure 3:
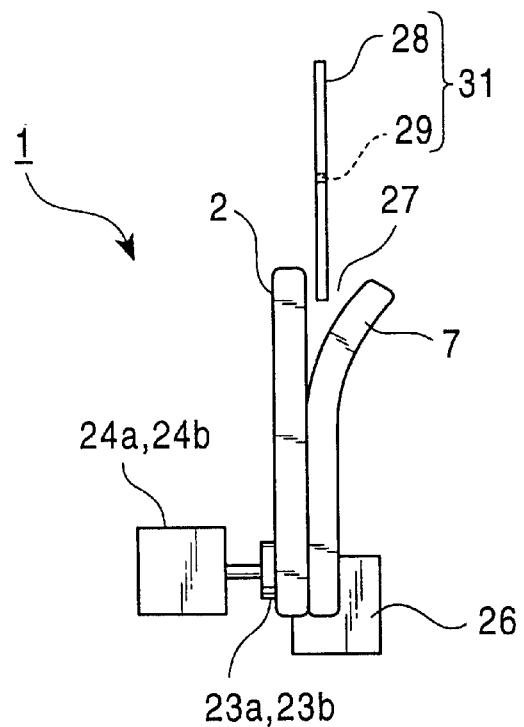
FIG. 3 is a side view of FIG. 2.

FIG. 2 is a perspective view showing a first embodiment of a setting device for setting the disc 31 in the cartridge 1, and FIG. 3 is a side view thereof.

The setting device includes an air cylinder (first-end coupling device) 24a having a cartridge-pressing part (first-end coupling device) 23a for pressing the back side right end of the front end 21a of the cartridge 1, an air cylinder (first-end coupling device) 24b having a cartridge-pressing part (first-end coupling device) 23b for pressing the back side left end of the front end 21a while keeping away from a shutter-mounting section 30, and a cover plate (first-end coupling device) 26 for preventing deformation of the surface of the front end 21a.

In such a construction, the front end 21a of the cartridge 1 is placed on the cover plate 26. The air cylinders 24a and 24b are extended, and the front end 21a is clamped between the cartridge-pressing parts 23a and 23b and the cover plate 26. The rear end 21b of the cartridge 1 is opened between the upper and lower shells 7 and 2, and the disc 31 having the chucking hub 29 attached to the central part thereof and an accidental erasure-protecting plug (see FIGS. 16A to 19B) are inserted from a rear end opening 27. Then, the rear end opening 27 is closed and the upper and lower shells-coupling sections 32 are secured by screws, whereby a disc cartridge 33 having the disc 31 accommodated therein is completed.

Figure 4:
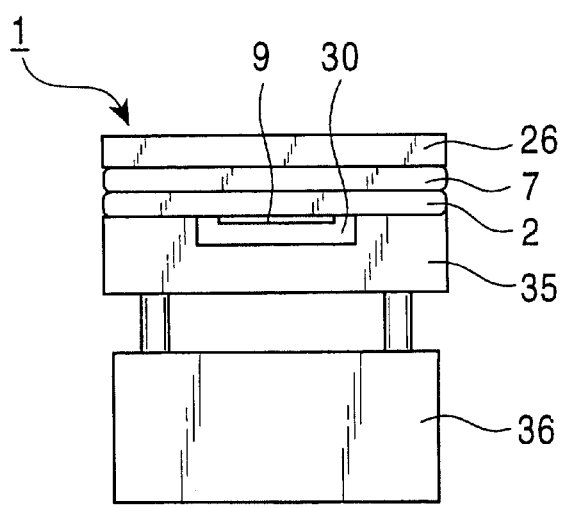
FIG. 4 illustrates a modification of the setting device shown in FIG. 2.

While the setting device includes the air cylinder 24a and the air cylinder 24b separately in the above embodiment, an air cylinder (first-end coupling device) 36 having one substantially U-shaped cartridge-pressing part (first-end coupling device) 35 that keeps away from the shutter-mounting section 30, as shown in, for example, FIG. 4, may be used.

Figure 5:
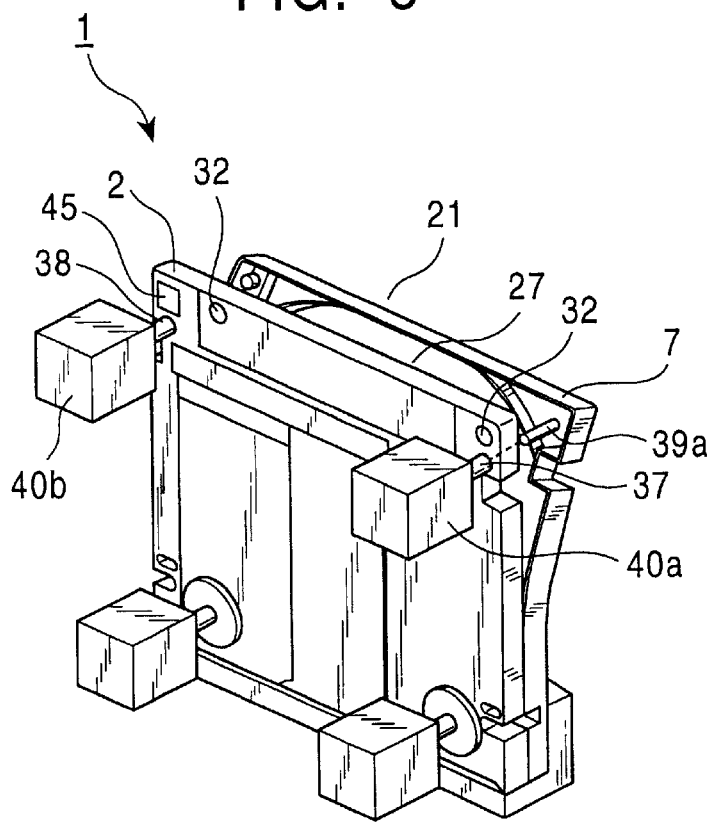
FIG. 5 is a perspective view showing a second embodiment of the setting device for setting a disc in the cartridge shown in FIG. 1.
Figure 6:
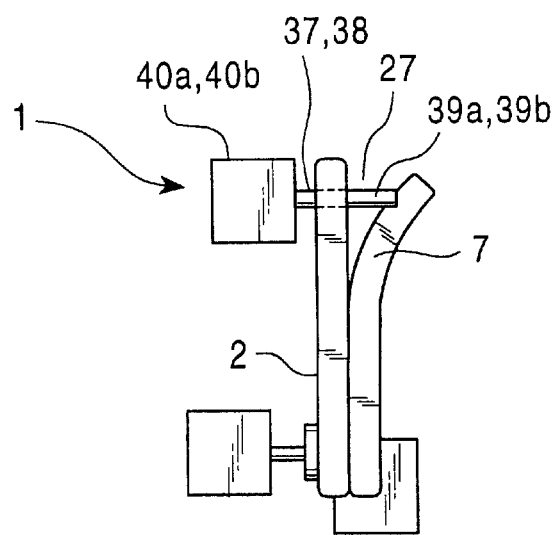
FIG. 6 is a side view of FIG. 5.

FIG. 5 is a perspective view showing a second embodiment of the setting device for setting the disc 31 in the cartridge 1, and FIG. 6 is a side view thereof.

In addition to the components of the setting device shown in FIGS. 2 and 3, the setting device of this embodiment includes an air cylinder (second-end opening device) 40a having a rod opening jig (second-end opening device) 39a which passes through a first reference hole 37 opened through the lower shell 2 to press the inner surface of the upper shell 7, and an air cylinder (second-end opening device) 40b having a rod opening jig (second-end opening device) 39b which passes through a second reference hole 38 formed through the lower shell 2 to press the inner surface of the upper shell 7.

In such a construction, the air cylinders 40a and 40b are projected, and the rod opening jigs 39a and 39b are inserted through the first and second reference holes 37 and 38, respectively. Then, the inner surface of the upper shell 7 that is disposed in such a manner as to cover the first and second reference holes 37 and 38 is pushed up by the jigs 39a and 39b, whereby the upper shell 7 is warped to separate from the lower shell 2, and the rear end opening 27 is formed.

Figure 7:
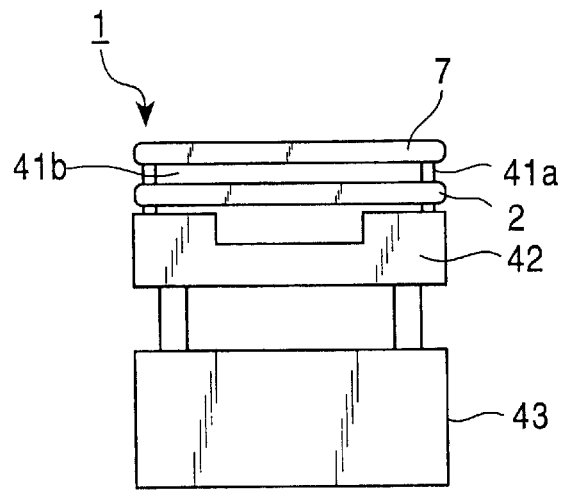
FIG. 7 illustrates a modification of the setting device shown in FIG. 5.

While the setting device includes the air cylinder 40a and the air cylinder 40b separately in the above embodiment, an air cylinder (second-end opening device) 43 having one connecting jig (second-end opening device) 42 provided with rod opening jigs (second-end opening devices) 41a and 41b on both ends thereof, as shown in, for example, FIG. 7, may be used.

Figure 8:
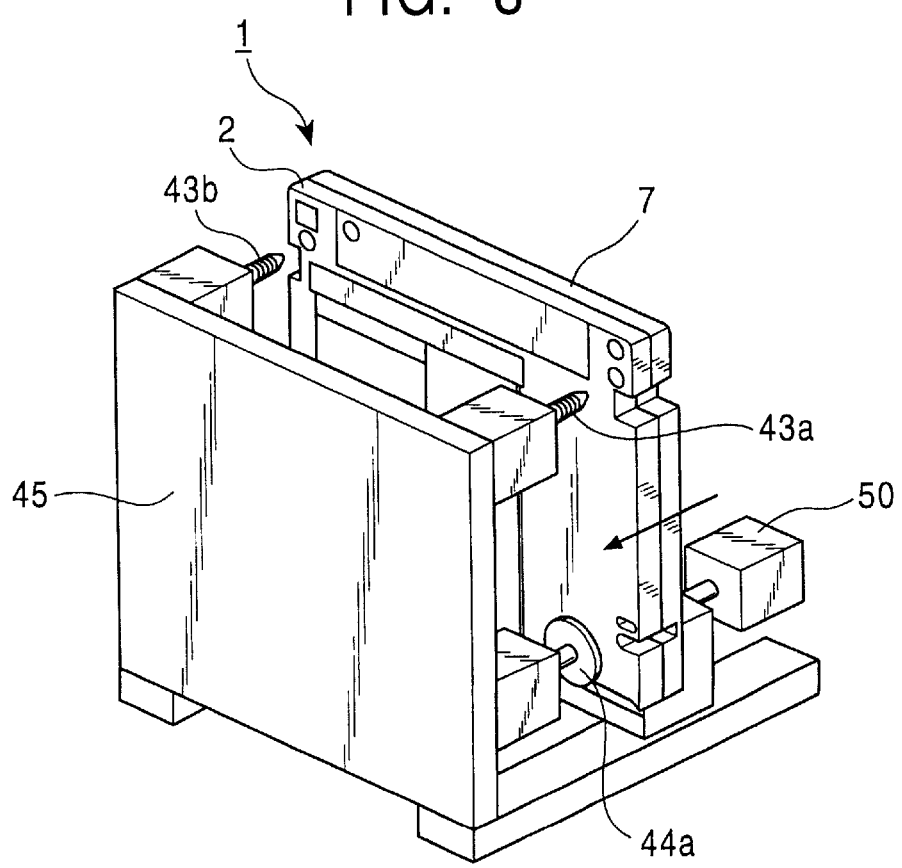
FIG. 8 illustrates another modification of the setting device shown in FIG. 5.

Furthermore, as shown in FIG. 8, the rod opening jigs 43a and 43b, and the cartridge-pressing parts 44a may be formed on one connecting jig 45, and the cover plate 26 may be pushed by an air cylinder 50. In addition to the first and second reference holes 37 and 38, an accidental erasure-protecting plug operating hole 45 formed in the lower shell 2 and the upper and lower shells-coupling sections 32 shown in FIG. 5 may be used.

Figure 9:
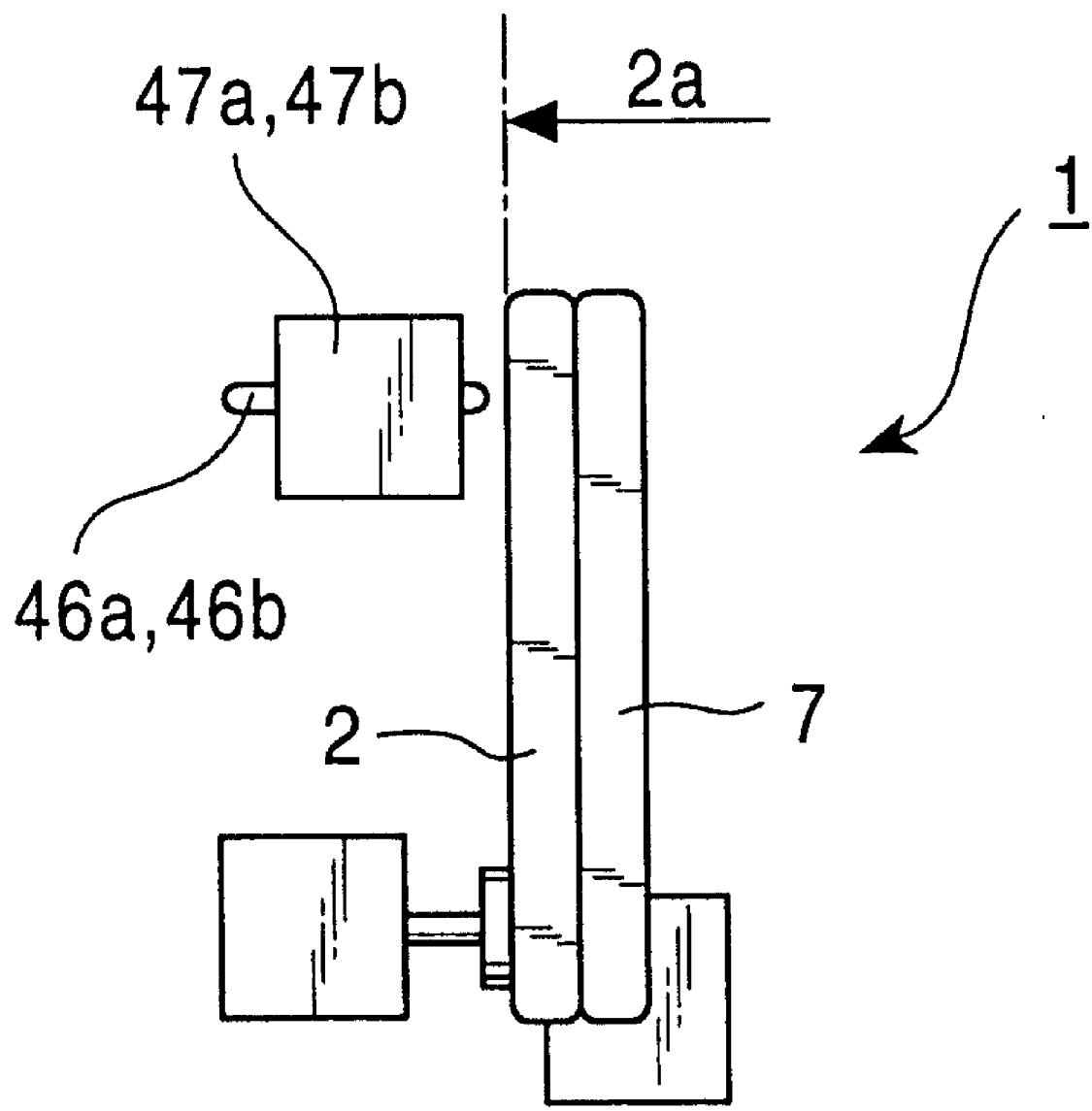
FIG. 9 is a sectional side view showing a third embodiment of the setting device for setting a disc in the cartridge shown in FIG. 1.

FIG. 9 is a sectional side view showing a third embodiment of a setting device for setting the disc 31 in the cartridge 1.

The setting device of this embodiment has substantially the same construction as that of the setting device shown in FIGS. 5 and 6, but rod opening jigs (second-end opening devices) 46a and 46b are passed through the air cylinders (second-end opening devices) 47a and 47b, and heads of the rod opening jigs 46a and 46b on the side of the lower shell 2 are separated from the bottom 2a of the lower shell 2. This can prevent the heads of the rod opening jigs 46a and 46b on the side of the lower shell 2 from scratching the cartridge 1 or interfering with the movement of the cartridge 1 when the cartridge 1 is set or moved into the setting device so as to open the cartridge 1.

Figure 10:
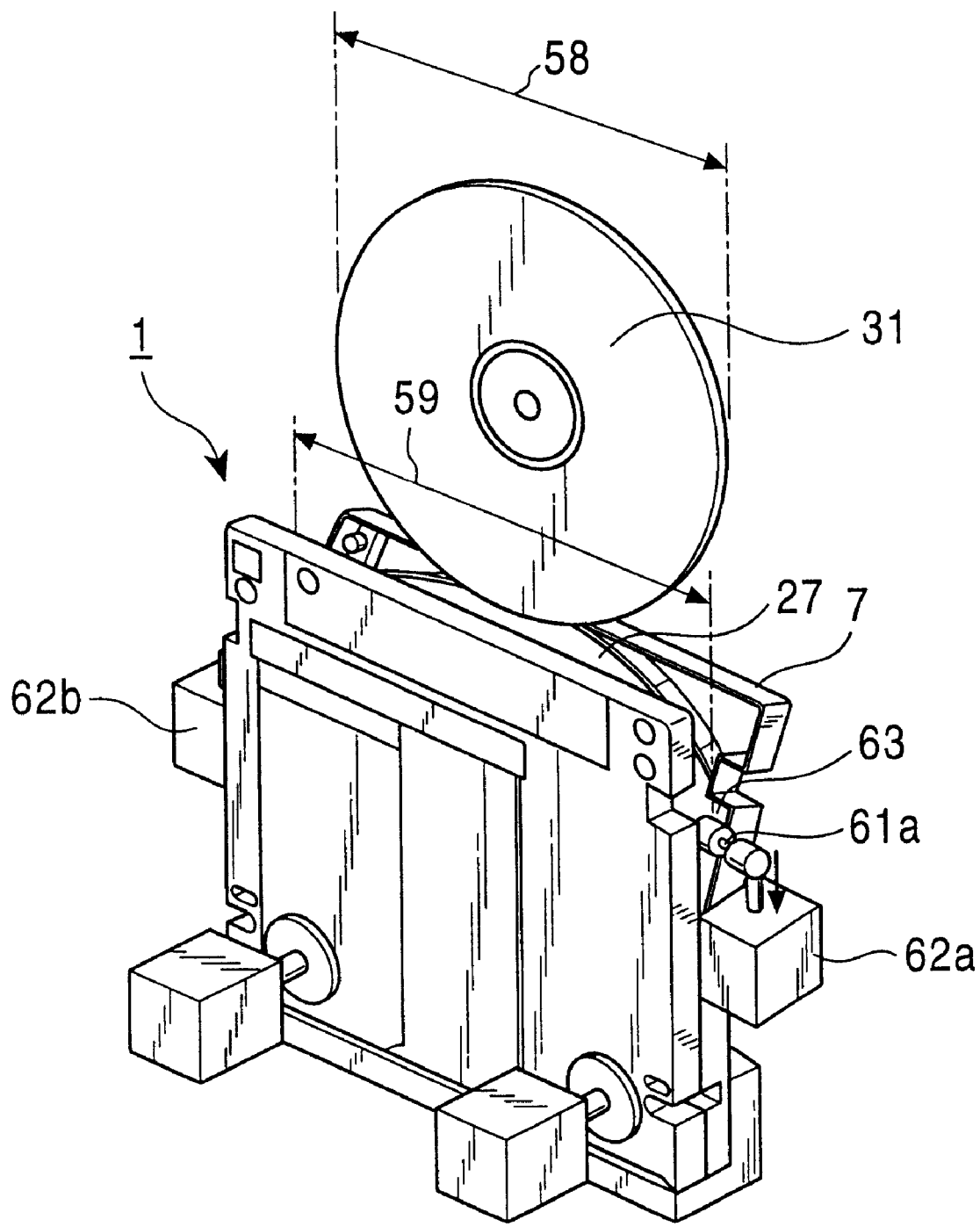
FIG. 10 is a perspective view showing a fourth embodiment of the setting device for setting a disc in the cartridge shown in FIG. 1.
Figure 11A:
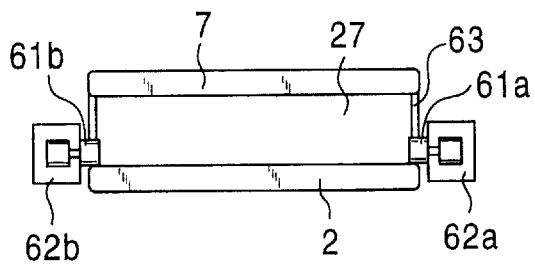
FIG. 11A is a top view.
Figure 11C:
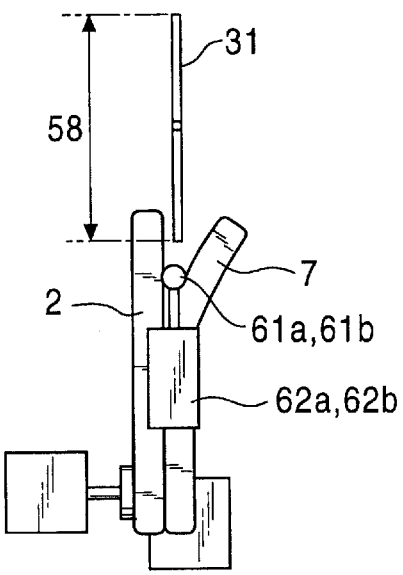
FIG. 11C is a side view of FIG. 10.
Figure 11B:
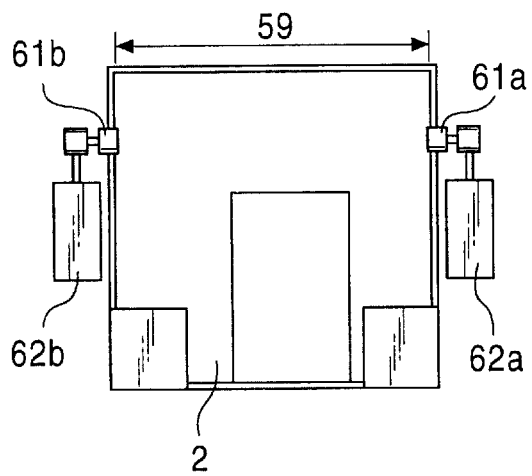
FIG. 11B is a front view.

FIG. 10 is a perspective view showing a fourth embodiment of the setting device for setting the disc 31 in the cartridge 1; and FIGS. 11A to 11C are a top view, a front view, and a side view thereof.

The setting device includes air cylinders 62a and 62b having cartridge rear-side-end opening jigs (second-end opening devices) 61a and 61b whose distance therebetween is set longer than the diameter 58 of the disc 31.

In such a construction, the cartridge rear-side-end opening jigs 61a and 61b are inserted into spaces 63 between the side surfaces of the upper and lower shells 7 and 2 of the rear end 21b of the cartridge 1, and are pressed downward using the air cylinders 62a and 62b, whereby the rear end opening 27 is formed. Since the inner distance 59 between the cartridge rear-end-side opening jigs 61a and 61b is longer than the diameter 58 of the disc 31, the disc 31 can be easily inserted into the cartridge 1 without being scratched.

Figure 12:
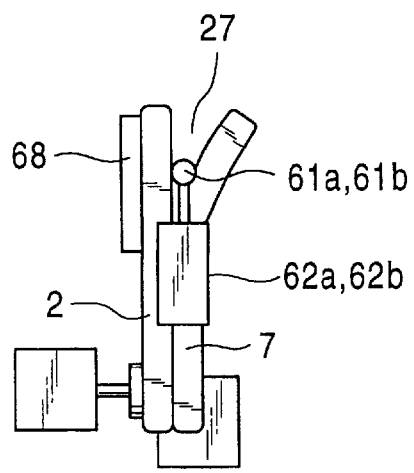
FIG. 12 is a side view showing a fifth embodiment of the setting device for setting a disc in the cartridge shown in FIG. 1.

FIG. 12 is a side view showing a fifth embodiment of the setting device for setting the disc 31 in the cartridge 1.

In addition to the components of the setting device shown in FIGS. 10 and 11, the setting device of this embodiment includes a cover plate (second-end fixing device) 68 for preventing deformation of the rear end 21b of the lower shell 2. This allows only the rear end 21b of the upper shell 7 to be warped when the cartridge rear-side-end opening jigs 61a and 61b are inserted into the spaces 63 between the side surfaces of the upper and lower shells 7 and 2 to form the rear end opening 27. Thus, the lower shell 2, which serves as a reference plane when setting the disc cartridge 33 in a recording/reproducing apparatus, is not deformed.

Figure 13:
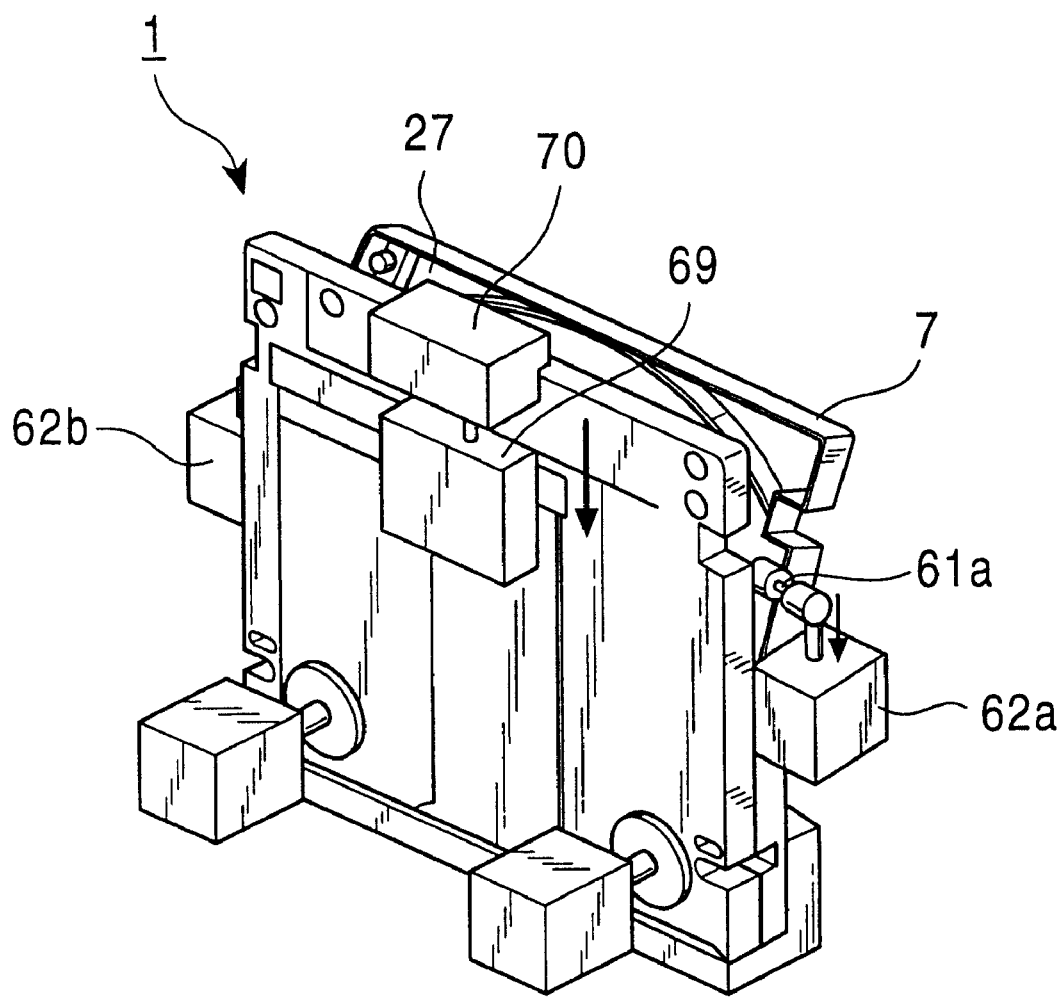
FIG. 13 is a perspective view showing a sixth embodiment of the setting device for setting a disc in the cartridge shown in FIG. 1.

FIG. 13 is a perspective view showing a sixth embodiment of the setting device for setting the disc 31 in the cartridge 1.

In addition to the components of the setting device shown in FIGS. 10 and 11, the setting device of this embodiment includes an air cylinder (second-end fixing device) 69 having a pressing jig (second-end fixing device) 70 for pressing and fixing the upper part of the rear end 21a of the lower shell 2. This allows the lower shell 2 to be separated from the upper shell 7 without being deformed when the cartridge rear-end-side opening jigs 61a and 61b are inserted into the spaces 63 between the side surfaces of the upper and lower shells 7 and 2 to form the rear end opening 27, or when the rod opening jigs 39a and 39b shown in FIGS. 5 and 6 are inserted into the first and second reference holes 37 and 38 of the lower shell 2 to form the rear end opening 27.

FIGS. 14A to 14D and FIGS. 15A to 15D are process drawings showing a seventh embodiment of the setting device for setting the disc 31 in the cartridge 1.

The setting device of this embodiment is a combination of the setting device shown in FIG. 9 and the setting device shown in FIG. 12.

Figure 14A:
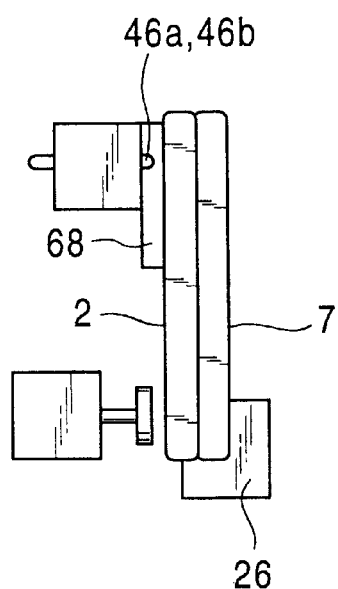
FIGS. 14A to 14D are first process drawings showing a seventh embodiment of the setting device for setting a disc in the cartridge shown in FIG. 1.
Figure 14B:
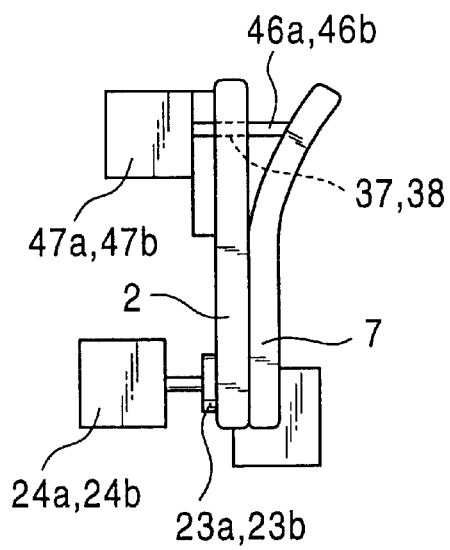

First, as shown in FIG. 14A, the front end 21a of the cartridge 1 is placed on the cover plate 26, the rear end 21b of the lower shell 2 is pressed by the cover plate 68, and the rod opening jigs 46a and 46b are disposed so that the heads thereof on the side of the lower shell 2 do not project from the front surface of the cover plate 68. Then, as shown in FIG. 14B, the cartridge pressing parts 23a and 23b attached to the air cylinders 24a and 24b are extended, and the rod opening jigs 46a and 46b are inserted through the first and second reference holes 37 and 38. The heads of the rod opening jigs 46a and 46b on the side of the lower shell 2 are pressed against the inner surface of the upper shell 7, whereby the rear end 21b of the upper shell 7 is deformed and the rear end 21b of the cartridge 1 is opened.

Figure 14C:
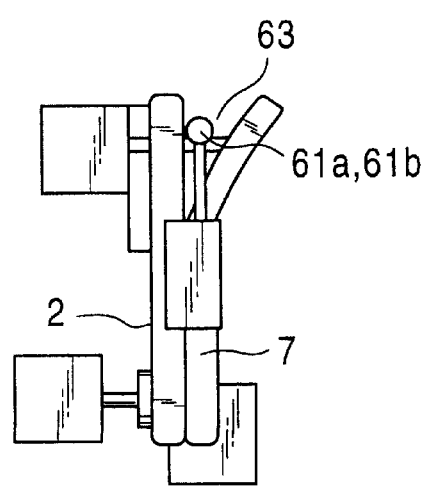
Figure 14D:
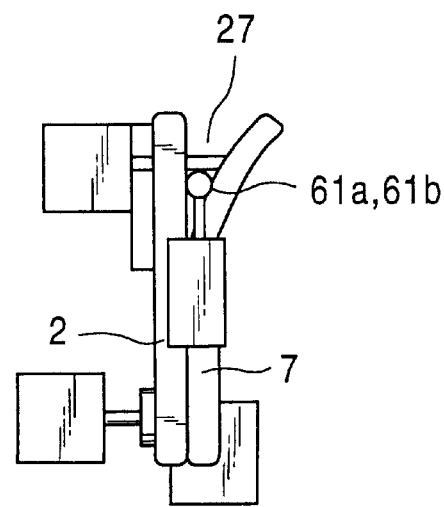

Next, as shown in FIG. 14C, the cartridge rear-side-end opening jigs 61a and 61b attached to the air cylinders 62a and 62b are inserted into the space 63 between the side surfaces of the upper and lower shells 7 and 2 of the rear end 21b of the cartridge 1. Then, as shown in FIG. 14D, the cartridge rear-side-end opening jigs 61a and 61b are moved downward, whereby the rear end opening 27 for inserting therein the disc 31 is formed.

Figure 15A:
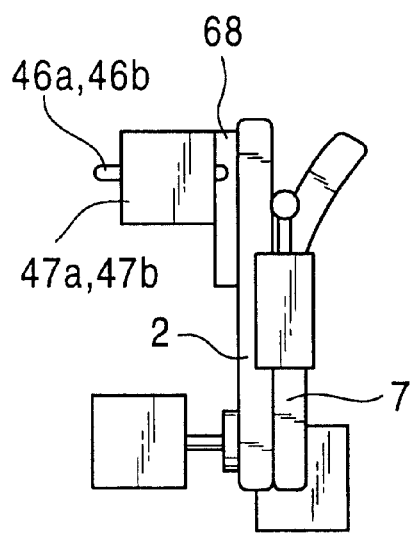
FIGS. 15A to 15C are second process drawings showing the seventh embodiment of the setting device for setting a disc in the cartridge shown in FIG. 1.
Figure 15B:
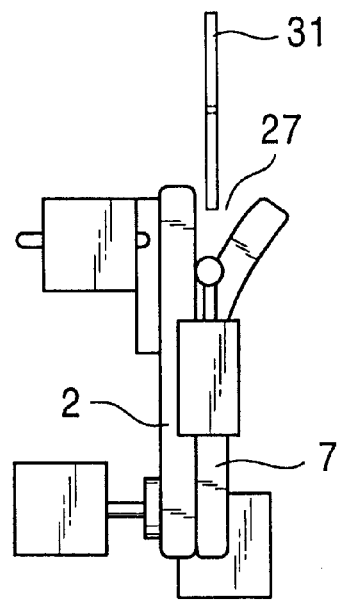

For the next step, as shown in FIG. 15A, the rod opening jigs 46a and 46b are retracted by the air cylinders 47a and 47b so as to be put back from the front surface of the cover plate 68. This allows the rod opening jigs 46a and 46b located within a range shorter than the diameter 58 of the disc 31 to be removed from the inside of the cartridge 1. Then, as shown in FIG. 15B, the disc 31 is inserted from the rear end opening 27 of the cartridge 1.

Figure 15C:
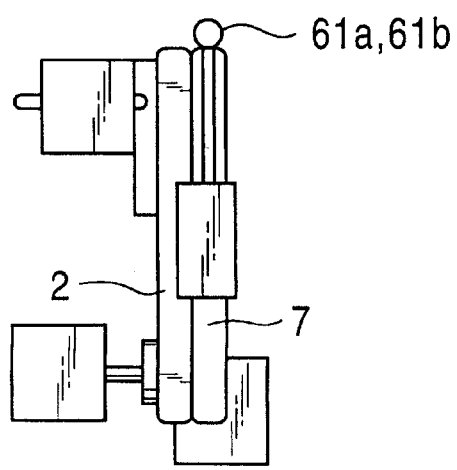

Finally, as shown in FIG. 15C, the cartridge rear-side-end opening jigs 61a and 61b are moved upward to be separated from the rear end 21b of the cartridge 1, whereby the rear end opening 27 of the cartridge 1 is coupled. Then, the upper and lower shells-coupling sections 32 are secured by screws, whereby the disc cartridge 33 is completed in which the disc 31 is accommodated. The combination of the setting devices is not limited to this embodiment, and any combination of the above-described setting devices may be made.

FIGS. 16A to FIGS. 19B are process drawings showing an eighth embodiment of a setting device for setting the disc 31 in the cartridge 1.

Figure 31:
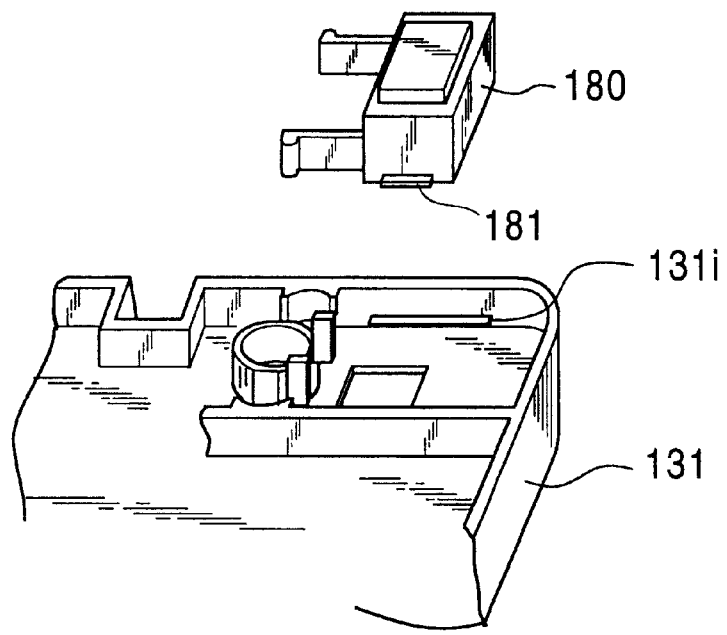
FIG. 31 is a perspective view showing a principal part of the disc cartridge shown in FIG. 30.

In the setting device of this embodiment, the rod opening jigs 46a and 46b shown in FIGS. 14A to 15B on the side of the accidental erasure-protecting plug 22 are replaced by accidental erasure-protecting plug presser jigs (second-end opening devices) 201, and the cartridge rear-side-end opening jigs 61a and 61b are replaced by accidental erasure-protecting plug presser plates (second-end opening devices) 203 having cartridge rear-side-end opening rollers (second-end opening devices) 202, so that accidental erasure-protecting plugs 22 can be prevented from falling out when the rear end opening 27 of the cartridge 1 is formed. This eliminates the need for using the accidental erasure-protecting member 180 provided with lugs 181 and the upper shell 131 having the recess 131i formed therein shown in FIG. 31, and can simplify the shape of the accidental erasure-protecting plugs 22 and the upper shell 7. The assembly steps can be also simplified. In FIGS. 16A to 19B, only the periphery of one of the accidental erasure-protecting plug 22 is illustrated, and other sections will be omitted because they are the same as those shown in FIGS. 14A to 15C.

Figure 16A:
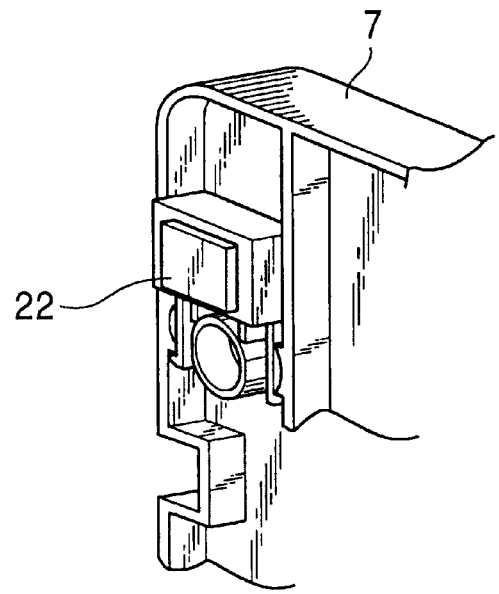
FIGS. 16A and 16B are first process drawings showing an eight embodiment of the setting device for setting a disc in the cartridge shown in FIG. 1.
Figure 16B:
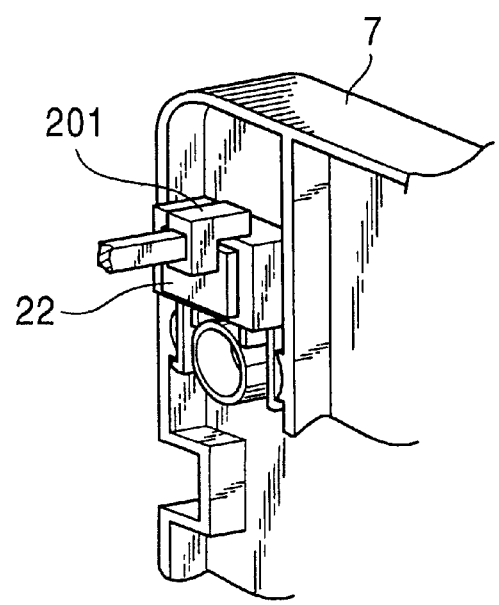

First, as shown in FIG. 16A, the accidental erasure-protecting plug 22 is disposed in the upper shell 7. Then, as shown in FIG. 16B, the accidental erasure-protecting plug presser jig 201 is inserted through the accidental erasure-protecting plug operating hole 45. The accidental erasure-protecting plug presser jig 201 is pressed against the accidental erasure-protecting plug 22 to be held, and the inner surface of the upper shell 7 is pressed via the accidental erasure-protecting plug 22, whereby the rear end 21b of the upper shell 7 is deformed and the rear end 21b of the cartridge 1 is opened.

Figure 17A:
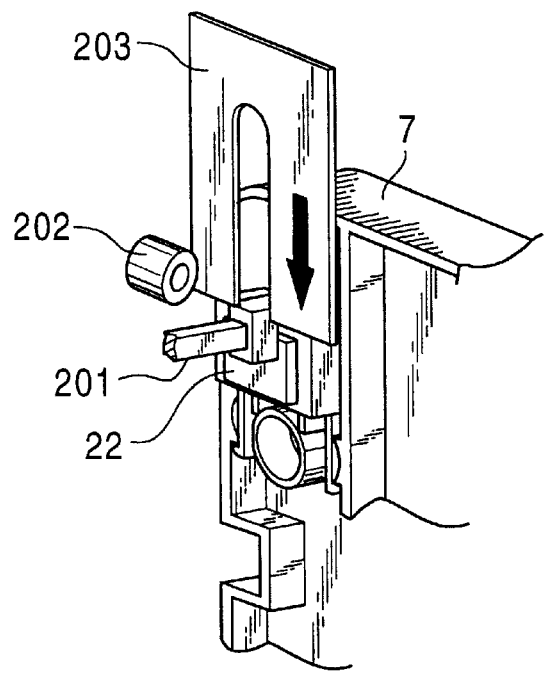
FIGS. 17A and 17B are second process drawings showing the eight embodiment of the setting device for setting a disc in the cartridge shown in FIG. 1.
Figure 17B:
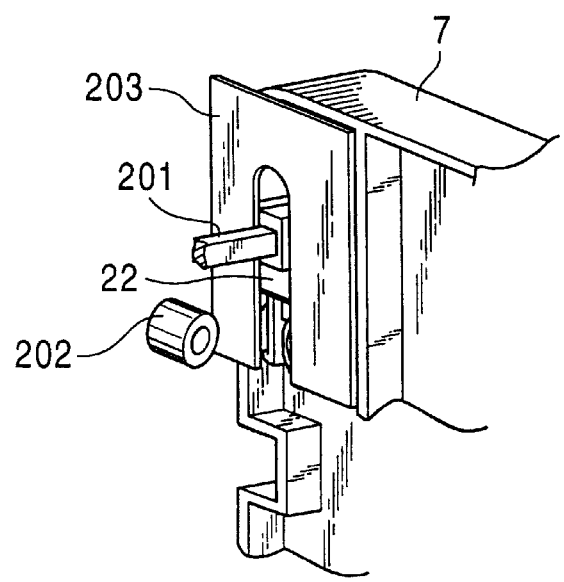

Next, as shown in FIG. 17A, the accidental erasure-protecting plug presser plate 203 having the cartridge rear side end-opening roller 202 is inserted into the space 63 between the side surfaces of the upper and lower shells 7 and 2 of the rear end 21b of the cartridge 201. Then, as shown in FIG. 17B the accidental erasure-protecting plug presser plate 203 is moved downward, whereby the accidental erasure-protecting plug 22 is covered and held, and the rear end opening 27 for inserting therein the disc 31 is formed.

Figure 18A:
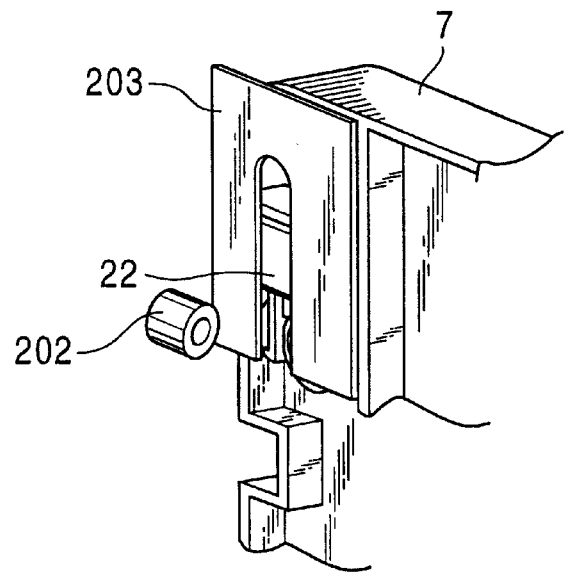
FIGS. 18A and 18B are third process drawings showing the eighth embodiment of the setting device for setting a disc in the cartridge shown in FIG. 1.
Figure 18B:
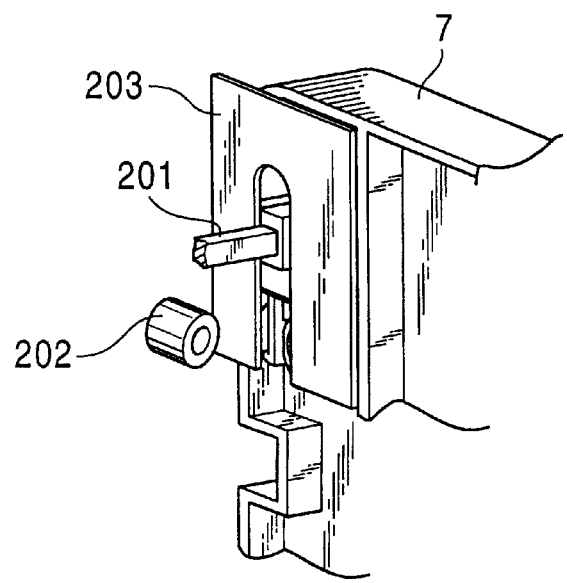

For the next step, as shown in FIG. 18A, the accidental erasure-protecting plug presser jig 201 is retracted by the air cylinder 51 to be put back from the front surface of the cover plate 68. This allows the accidental erasure-protecting plug presser jig 201 located within a range shorter than the diameter 58 of the disc 31 to be removed from the inside of the cartridge 1, so that the disc 31 is inserted from the rear end opening 27 of the cartridge 1. Thereafter, as shown in FIG. 18B, the accidental erasure-protecting plug presser jig 201 is pressed to be held against the accidental erasure-protecting plug 22 again.

Figure 19A:
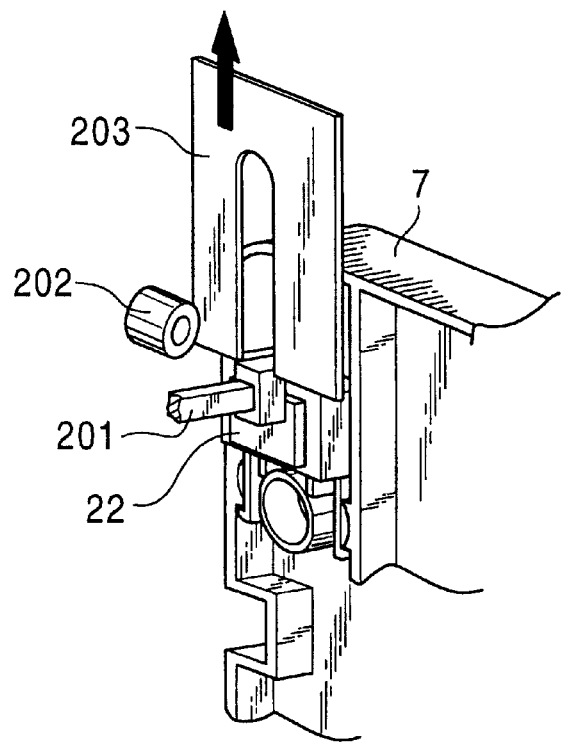
FIGS. 19A and 19B are fourth process drawings showing the eighth embodiment of the setting device for setting a disc in the cartridge shown in FIG. 1.
Figure 19B:
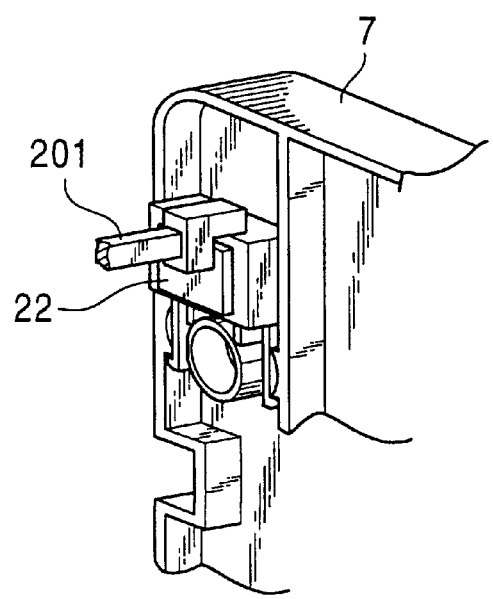

Finally, as shown in FIG. 19A, the accidental erasure-protecting plug presser plate 203 is moved upward to be separated from the rear end 21b of the cartridge 1, and the accidental erasure-protecting plug presser jig 201 is retracted by the air cylinder 51 to couple the rear end opening 27 of the cartridge 1, as shown in FIG. 19B. Then, the upper and lower shells-coupling sections 32 are secured by screws, whereby the disc cartridge 33 is completed in which the disc 31 is accommodated.

Figure 20:
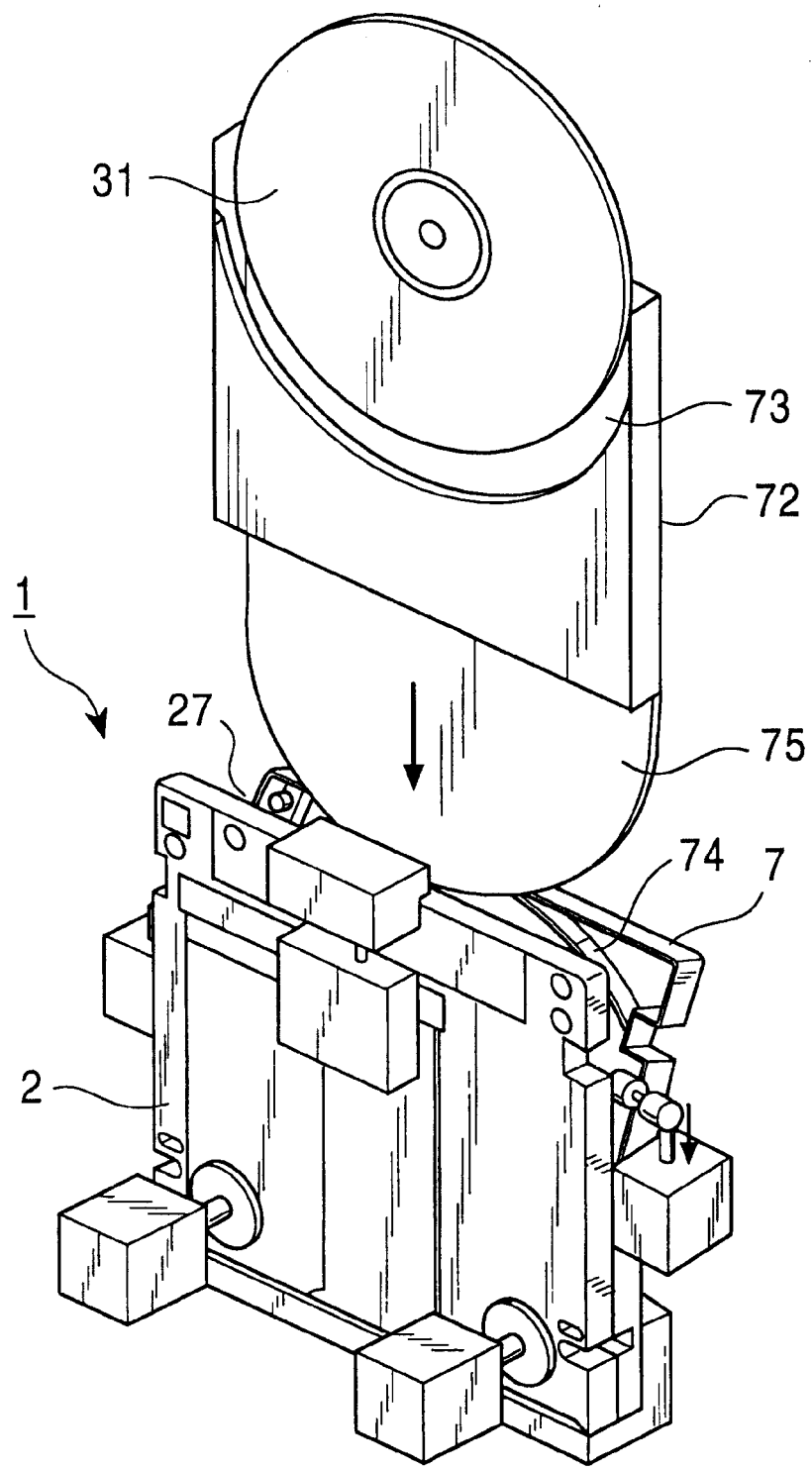
FIG. 20 is a perspective view showing a ninth embodiment of the setting device for setting a disc in the cartridge shown in FIG. 1.

FIG. 20 is a perspective view showing a ninth embodiment of the setting device for setting the disc 31 in cartridge 1.

The setting device of this embodiment is formed so as to have a thickness greater than that of the disc and to have a diameter larger than that of the disc, and includes a disc slide guide 72 having a disc insertion opening 73 for inserting therein the disc 31 and a disc slid guide plate 75 for sliding the inserted disc 31. In inserting the disc 31 from the rear end opening 27, the disc slide guide plate 75 is inserted to the center of the cartridge 1, the disc 31 is inserted from-the disc insertion opening 73 along the disc slide guide plate 75 so as to be brought into contact with a circular-arc rib 74 of the cartridge 1, whereby the disc 31 can be accommodated in the cartridge 1 without being scratched.

An anionic, cationic, or a non-ion surfactant, or an antistatic agent consisting of polarized macromolecules diluted in a solvent, such as isopropyl alcohol, is applied on the surface of the disc slide guide 72 by spraying or the like and dried, whereby an antistatic effect can be imparted to the disc slide guide 72. Furthermore, if a mixture of a polyester resin and 3% by weight conductive powders, such as tin oxide or antimony, is applied to the surface of the disc slide guide 72 or if the disc slide guide 72 is prepared by using a material filled with carbon or antielectric polymer, the antistatic effect can be maintained for a long period of time. If the antistatic effect is imparted to the disc slide guide 72 as described above, frictional electrification generated when the disc 31 slides on the surface of the disc slide guide 72 can be suppressed, and dust can be prevented from adhering to the surface of the charged disc slide guide 72 or the disc 31, and from scratching the disc 31.

The disc slide guide plate 75 is prepared by cutting, for example, a stainless steel plate having a thickness of 0.2 mm, or a synthetic resin plate, such as a PP plate, a PET (polyethylene terephthalate) plate, or a polyethylene plate. The surface of the disc slide guide plate 75 is formed to be smooth so as not to scratch the disc 31 when the disc 31 is inserted from the rear end opening 27 of the cartridge 1. The head of the disc slide guide plate 75 is formed with substantially the same radius as the disc 31 so as not to damage the circular-arc rib 74 of the cartridge 1 even if it comes into contact with the circular-arc rib 74.

Figure 21:
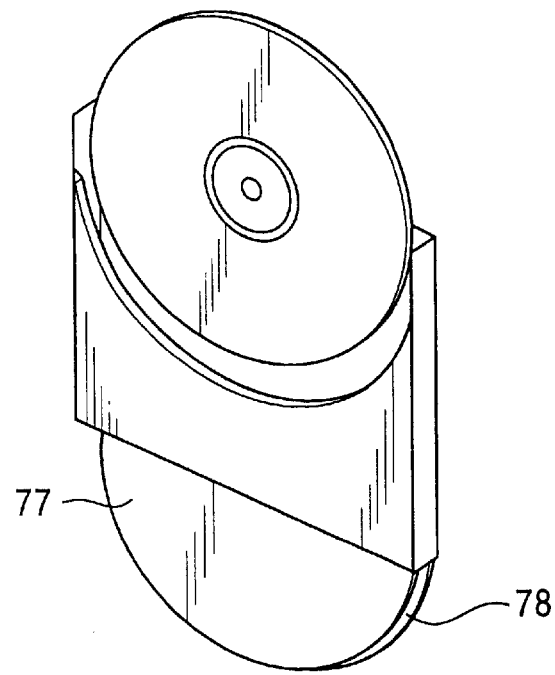
FIG. 21 illustrates a modification of the setting device shown in FIG. 20.

If a disc slide guide 78 having a tongue-like disc slide guide plate 77 whose lower end is opened is provided, as shown in FIG. 21, a similar disc guiding effect can be obtained. The disc slide guide plate 77 is prepared using, for example, a sheet material such as polyethylene, PP, or PET, having a thickness of about 0.05 to 0.2 mm.

Figure 22:
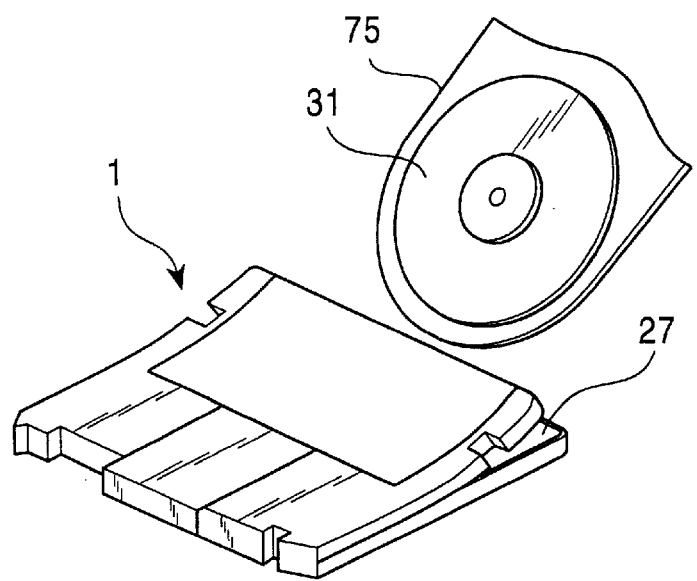
FIG. 22 illustrates another modification of the setting device shown in FIG. 20.

In addition, in inserting the disc 31 from the rear end opening 27 of the cartridge 1, the cartridge 1 is inclined in such a manner that the rear end opening 27 is higher than the front end 21a, as shown in FIG. 22. This allows the disc 31 to be slid into the cartridge 1 from the rear end opening 27 along the disc slide guide plate 75, so that the disc 31 can be easily accommodated in the cartridge 1.

Figure 23:
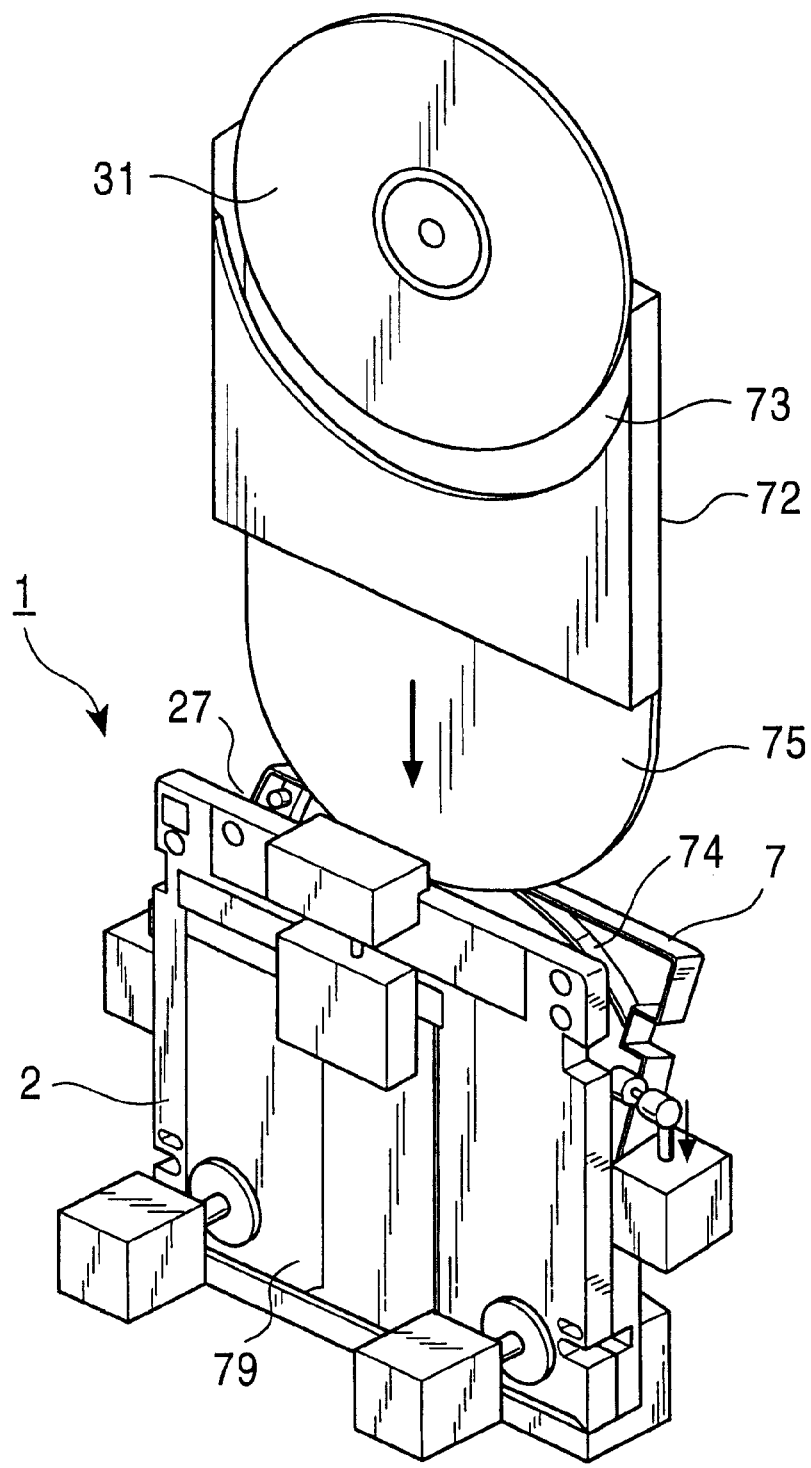
FIG. 23 illustrates a further modification of the setting device shown in FIG. 20.

Furthermore, in inserting the disc 31 from the rear end opening 27 of the cartridge 1, the cartridge 1 is disposed substantially perpendicularly in such a manner that the rear end opening 27 is located above and the front end 21a is located below, as shown in FIG. 23. This allows the disc 31 to be allowed to freely fall into the cartridge 1 from the rear end opening 27 along the disc slide guide plate 75, so that the disc 31 can be accommodated in the cartridge 1 very easily.

Figure 24:
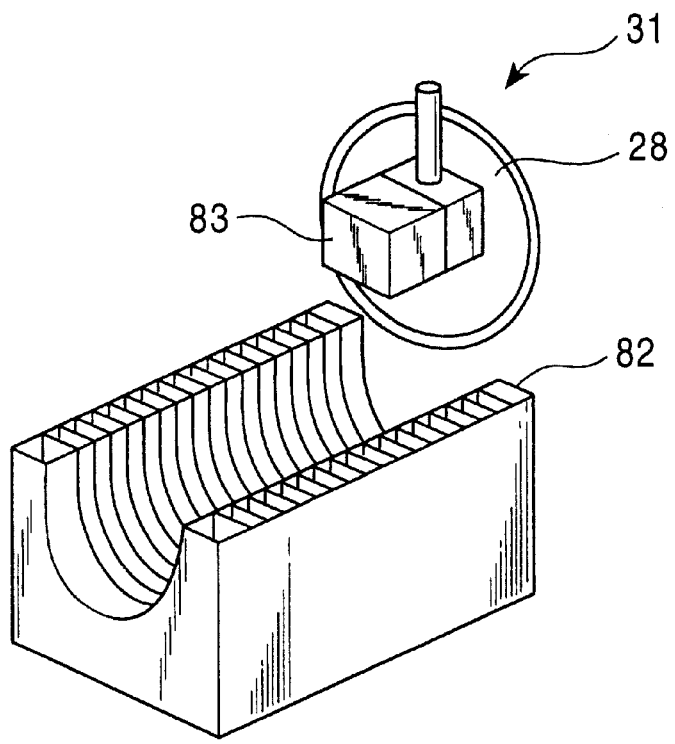
FIG. 24 is a perspective view showing a tenth embodiment of the setting device for setting a disc in the cartridge shown in FIG. 1.

FIG. 24 is a perspective view showing a tenth embodiment of the setting device for setting the disc 31 in the cartridge 1.

The setting device of this embodiment includes a disc holder (magnetic attracting-and-carrying device) 83 for magnetically attracting and carrying the chucking hub 29 of the disc 31 using a magnetic force of a magnet. This eliminates the need for holding a recording area 28 of the disc 31 when taking the disc 31 out of a disc stocker 82 and inserting into the rear end opening 27 of the cartridge 1. Therefore, the disc 31 can be easily accommodated in the cartridge 1 without scratching the recording area 28.

Figure 25:
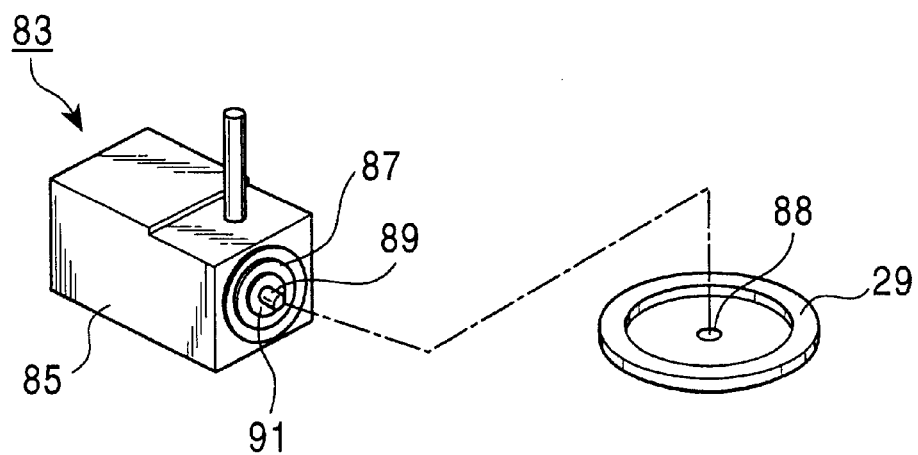
FIG. 25 is a detail view of the setting device shown in FIG. 20.
Figure 26A:
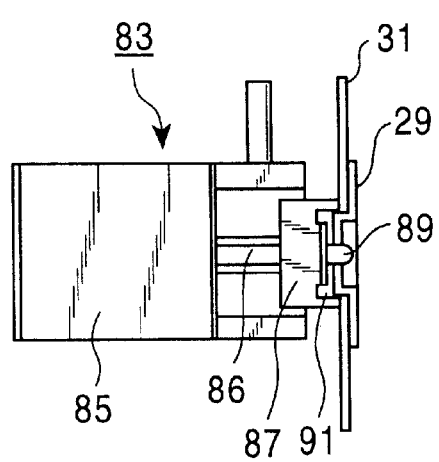
FIGS. 26A and 26B illustrate operations of the setting device shown in FIG. 20.
Figure 26B:
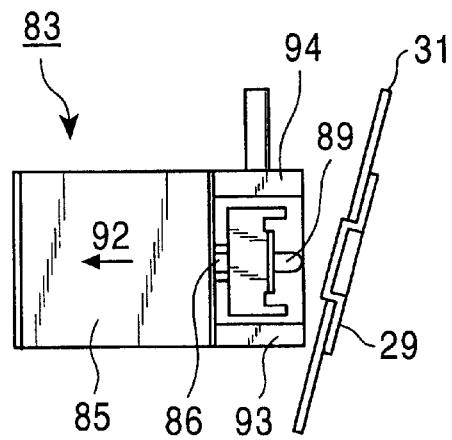

In the disc holder 83, as shown in FIGS. 25 to 26B, a chucking hub-engaging shaft 89 having a diameter smaller than that of a recording/reproducing apparatus driving shaft-insertion hole 88 formed in substantially the center of a chucking hub 29 made of magnetic metal is provided to the tip of a flange 87 that is attached to the head of a spindle 86 of an air cylinder 85, and a magnet 91 is attached so as to surround the chucking hub-engaging shaft 89.

As shown in FIG. 26A, when the chucking hub-engaging shaft 89 is inserted into the recording/reproducing apparatus driving shaft-insertion hole 88 in a state where the air cylinder 85 is pushed out, the chucking hub 29 is attracted and held by the magnet 91. Therefore, the disc 31 is moved, and other operations of the disc holder 83 are performed in this state.

By retracting the air cylinder 85 in a direction of the arrow 92, as shown in FIG. 26B, the chucking hub-engaging shaft 89 is also retracted and the disc 31 held by the chucking hub-engaging shaft 89 is moved in the direction of the arrow 92. However, the disc 31 is blocked by a front end 94 of a holder 93 connected to the air cylinder 85 and having an annular inner wall, and only the chucking hub-engaging shaft 89 is accommodated in the holder 93. Therefore, the magnetic force of the magnet 91 for holding the disc 31 is lost and the disc 31 falls out of the disc holder 83.

Figure 27:
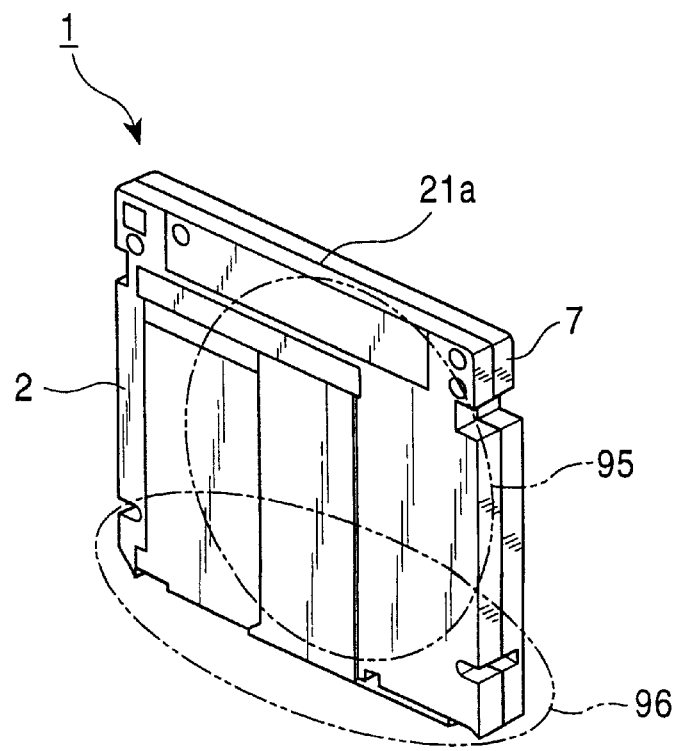
FIG. 27 is a first perspective view showing a coupling state of the cartridge shown in FIG. 1.

As shown in FIG. 27, the upper and lower shells 7 and 2 constituting the cartridge 1 in the embodiments described above are coupled by an ultrasonic resin welding method in an area from substantially the center towards the front end 21a except a disc accommodating area 95. This allows the front end 21a to be rigidly welded over a wide area, and separation of a front ends-coupling section 96 of the upper and lower shells 7 and 2 can be prevented when the rear end 21b is opened.

In addition, a disc 31 that is determined to be defective when inserted from the rear end 21b of the cartridge 1 and subjected to quality inspection can be removed from the rear end 21b before coupling the rear end 21b of the cartridge 1. Therefore, the yield of the components can be ensured and the quality thereof can be maintained.

Figure 28:
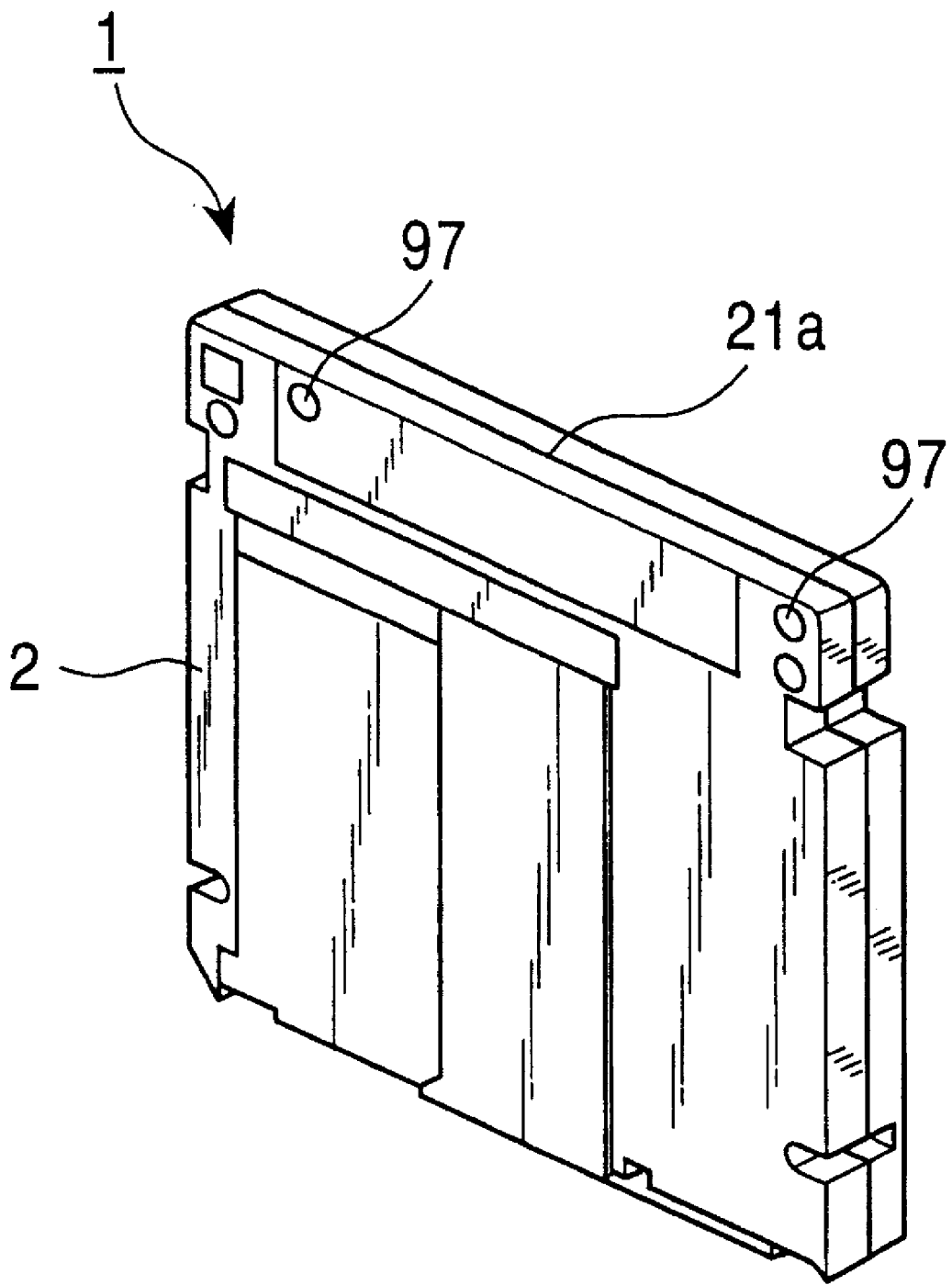
FIG. 28 is a second perspective view showing a coupling state of the cartridge shown in FIG. 1.

Furthermore, the rear end 21b of the cartridge 1 is coupled by screws 97 after inserting the disc 31 into the cartridge 1, as shown in FIG. 28, whereby scratches or abrasion of the inner surface of the cartridge 1 and the disc 31 that occurs when the rear end 21b is coupled using vibration, such as by ultrasonic welding, is avoided, and the disc cartridge can be manufactured without degrading the quality of the disc 31.

Figure 29:
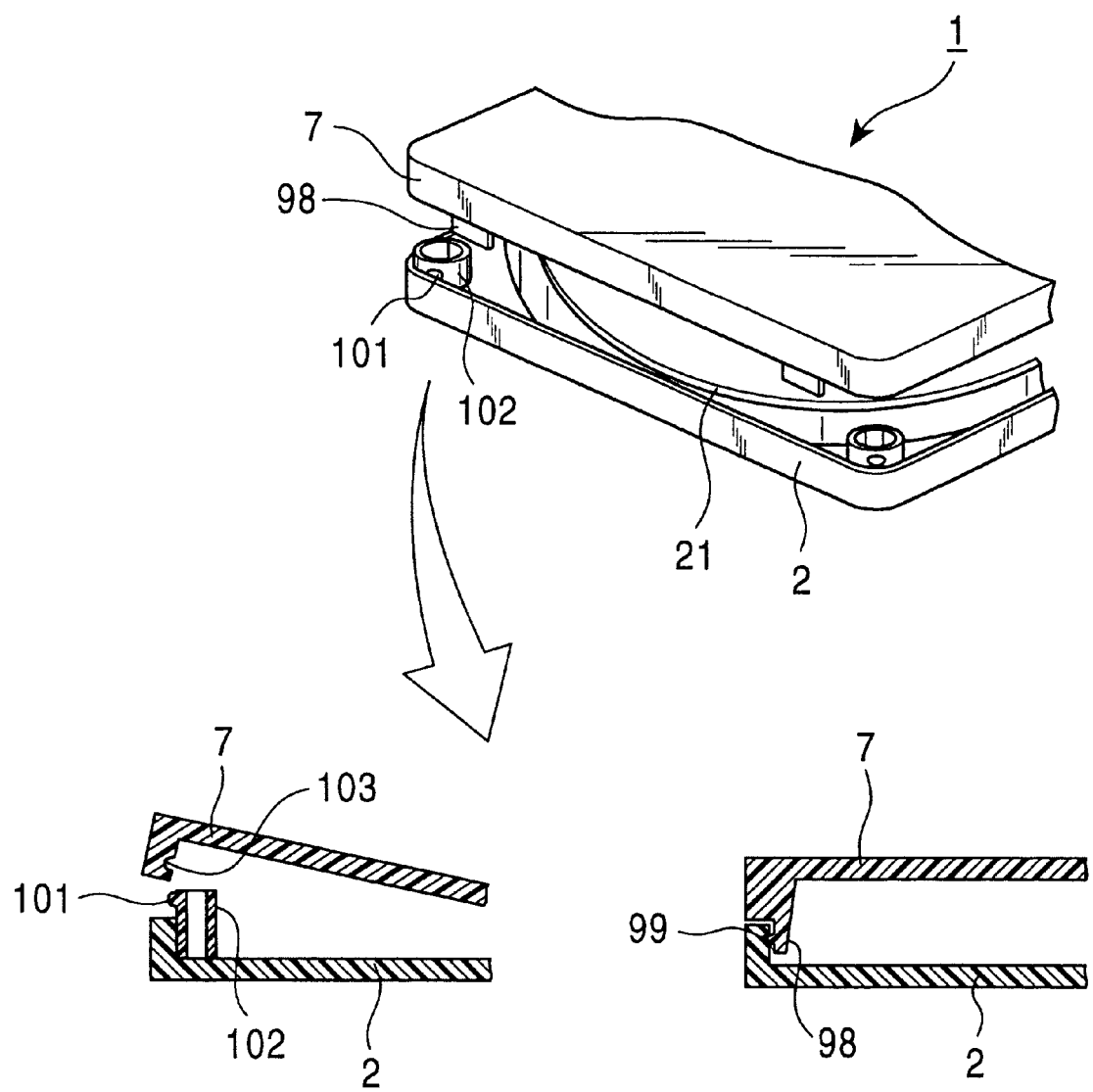
FIG. 29 is a third perspective view showing a coupling state of the cartridge shown in FIG. 1.

In order to temporarily couple the lower shell 2 and the upper shell 7, an engaging pawl 98 is formed on the upper shell 7 and an engaging hole 99 that engages with the engaging pawl 98 for temporarily coupling the rear ends 21b of the upper and lower shells 7 and 2 is formed, as shown in FIG. 29. Misoperation can be avoided in which the rear end 21b of the cartridge 1 is opened, the inserted disc 31 accidentally pops out of the cartridge 1, and is scratched when the disc 31 inserted into the cartridge 1 by the recording/reproducing apparatus is inspected, or misoperation in which the rear end 21b of the cartridge 1 moves up and the cartridge 1 cannot be ejected from the recording/reproducing apparatus.

Furthermore, an engaging projection 101 may be formed on an outer wall 102 of a screw insertion hole, and a hole 103 engaging with the engaging projection 101 may be formed in the corresponding upper shell 7. Even if a mechanism for temporarily coupling the upper and lower shells 7 and 2 is formed from substantially the center of the cartridge 1 to both sides of the rear end 21b in addition to the rear end 21b, a temporary coupling effect can be similarly obtained.

According to the above-described embodiments, cartridge components may be subjected to air cleaning with clean air being assembled. Therefore, the disc cartridge can be assembled without requiring a strictly managed clean room. In addition, since the component-incorporated cartridge is used, the need for strictly synchronizing the tact of the manufacture of the disc and the tact of the assembly of the disc cartridge is eliminated. Furthermore, since the upper and lower shells are coupled by screws after inspecting the disc in the cartridge, a disc that is determined to be defective is easily taken out and exchanged. In addition, since the rear end of the cartridge is not secured by screws, the cartridge can be used any number of times and is not wasted.

As described above, according to the present invention, a large-scale manufacturing facility is not required, and manufacturing efficiency can be increased.

What is claimed is:

1. A method for manufacturing a disc cartridge having a pair of opposing upper and lower shells, and an information recording medium disc accommodated therebetween, said method comprising:

mutually coupling first ends of said shells;

opening second ends of said shells when the first ends of said shells are coupled; and inserting said disc from the second ends of said shells, wherein second-end opening means are inserted into holes formed toward the second ends from approximate centers of said shells and are opened through the lower shell so as to press an inner surface of the upper shell, to thereby open the second ends of said shells.

2. A method for manufacturing a disc cartridge according to claim 1, wherein the first ends of said shells are pressed by first-end coupling means away from a shutter to thereby couple first ends of said shells.

3. A method for manufacturing a disc cartridge according to claim 1, wherein only a second end of an upper shell is deformed by a second-end opening means to thereby open the second ends of said shells.

4. A method for manufacturing a disc cartridge according to claim 1, wherein said disc is inserted while maintaining the second ends of said shells open by said second-end opening means.

5. A method for manufacturing a disc cartridge according to claim 1, wherein said second-end opening means are provided apart from the lower shell, are extended, and are inserted into said holes.

6. A method for manufacturing a disc cartridge according to claim 1, wherein components mounted in the upper shell at a position facing said holes are pressed by said second-end opening means to thereby prevent said components from falling out when opening the second ends of said shells.

7. A method for manufacturing a disc cartridge according to claim 1, further comprising:

attaching a guide for protecting a disc surface to at least one of the upper and lower surfaces of said disc;

inserting said guide from the second ends of said shells; and inserting said disc from the second ends of said shells along said guide.

8. A method for manufacturing a disc cartridge according to claim 7, wherein said disc is inserted from the second ends of said shells which are at least inclined so as to be higher than the first ends and are opened so that the second ends are located above the first ends.

9. A method for manufacturing a disc cartridge according to claim 7, wherein an antistatic treatment is applied to a section of said guide contacting said disc.

10. A method for manufacturing a disc cartridge according to claim 1, wherein said disc is removed from a disc stocker for stocking said disc by attracting and repelling said disc using a magnetic force of a magnet, and is inserted from the opened second ends of said shells.

11. A method for manufacturing a disc cartridge according to claim 1, wherein the first ends of said shells are welded.

12. A method for manufacturing a disc cartridge according to claim 1, further comprising:

confirming a sufficient recording/reproducing quality of said disc; and coupling the second ends of said shells.

13. A method for manufacturing a disc cartridge according to claim 1, further comprising:
  inserting said disc from the opened second ends of said shells; and
  coupling the second ends of said shells by screws.

14. A method for manufacturing a disc cartridge according to claim 1, wherein a temporary setting structure is formed toward the second ends from a central area of said shells.

15. A method for manufacturing a disc cartridge having a pair of opposing upper and lower shells, and an information recording medium disc accommodated therebetween, said method comprising:
  mutually coupling first ends of said shells;
  opening second ends of said shells when the first ends of said shells are coupled; and
  inserting said disc from the second ends of said shells, wherein second-end opening means are inserted into spaces between side surfaces of said shells so as to open the second ends of said shells, wherein a distance between each of the second-end opening means is greater than an outer diameter of said disk.

16. A method for manufacturing a disc cartridge according to claim 15, wherein the second end of the upper shell is pressed and fixed by a second-end fixing means, and the second end of the lower shell is opened by said second-end opening means.

17. A method for manufacturing a disc cartridge having a pair of opposing upper and lower shells, and an information recording medium disc accommodated therebetween, said method comprising:
  mutually coupling first ends of said shells;
  opening second ends of said shells when the first ends of said shells are coupled; and
  inserting said disc from the second ends of said shells; and further comprising:
    inserting first second-end opening means into holes formed towards the second ends from a central area of said shells and opened through the lower shell;
    pressing an inner surface of the upper shell so as to open the second ends of said shells;
    inserting said second-end opening means into spaces between side surfaces of said disc, whereby a distance therebetween is larger than a diameter of said disc; and
    removing said first second-end opening means from said holes.

18. An apparatus for manufacturing a disc cartridge having a pair of opposing upper and lower shells, an information recording medium disc accommodated therebetween, said apparatus comprising:
  first-end coupling means for mutually coupling first ends of said shells; and
  second-end opening means for opening second ends of said shells when the first ends of said shells are coupled by said first-end coupling means, wherein said second-end opening means are inserted into holes formed toward the second ends from approximate centers of said shells and are opened through the lower shell so as to press an inner surface of the upper shell, to thereby open the second ends of said shells,
  wherein said disc is inserted from the opened second ends of said shells.

19. An apparatus for manufacturing a disc cartridge according to claim 18, further comprising a guide for guiding said disc when inserting said disc from the opened second ends of said shells.

20. An apparatus for manufacturing a disc cartridge according to claim 18, further comprising a magnetic attracting-and-carrying means for carrying said disc from a disc stocker to the second ends of said shells using a magnetic force of a magnet.

* * * * *